United States Patent
Xiu et al.

(10) Patent No.: US 12,069,297 B2
(45) Date of Patent: *Aug. 20, 2024

(54) METHODS AND APPARATUSES FOR PREDICTION REFINEMENT WITH OPTICAL FLOW, BI-DIRECTIONAL OPTICAL FLOW, AND DECODER-SIDE MOTION VECTOR REFINEMENT

(71) Applicant: BEIJING DAJIA INTERNET INFORMATION TECHNOLOGY CO., LTD., Beijing (CN)

(72) Inventors: Xiaoyu Xiu, San Diego, CA (US); Yi-Wen Chen, San Diego, CA (US); Xianglin Wang, San Diego, CA (US); Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 112 days.

This patent is subject to a terminal disclaimer.

(21) Appl. No.: 17/714,916

(22) Filed: Apr. 6, 2022

(65) Prior Publication Data
US 2022/0239943 A1 Jul. 28, 2022

Related U.S. Application Data

(63) Continuation of application No. PCT/US2020/055153, filed on Oct. 9, 2020.
(Continued)

(51) Int. Cl.
H04N 19/00 (2014.01)
H04N 19/105 (2014.01)
(Continued)

(52) U.S. Cl.
CPC ......... *H04N 19/577* (2014.11); *H04N 19/105* (2014.11); *H04N 19/132* (2014.11);
(Continued)

(58) Field of Classification Search
CPC ...................................................... H04N 19/00
See application file for complete search history.

(56) References Cited

U.S. PATENT DOCUMENTS

| 2018/0262773 A1 | 9/2018 | Chuang et al. |
| 2022/0014776 A1* | 1/2022 | Sethuraman ......... H04N 19/513 |

(Continued)

FOREIGN PATENT DOCUMENTS

| KR | 1020180119084 A | 11/2018 |
| WO | 2021050234 A1 | 3/2021 |

OTHER PUBLICATIONS

Chen, Jianle et al., "Algorithm description for Versatile Video Coding and Test Model 6 (VTM 6)", Joint Video Experts Team (JVET) of ITU-T SG 16 WP 3 and ISO/IEC JTC 1/SC 29/WG 11, JVET-O2002-v2, 15th Meeting: Gothenburg, SE, Jul. 3-12, 2019, (89p).

(Continued)

*Primary Examiner* — Maryam A Nasri
(74) *Attorney, Agent, or Firm* — Arch & Lake LLP; Zhangyuan Ji; Hao Tan

(57) ABSTRACT

A bit-depth representation method, apparatus, and a non-transitory computer-readable storage medium are provided. A decoder obtains a reference picture I associated with a video block within the video signal. The decoder obtains prediction samples of the video block from a reference block in the reference picture I. The decoder controls internal PROF parameters of a PROF derivation process by applying right-shifting to the internal PROF parameters based on a bit-shift value to achieve a preset precision. The decoder (Continued)

obtains prediction refinement values for samples in the video block based on the PROF derivation process being applied to the video block based on the prediction samples. The decoder obtains prediction samples of the video block based on the combination of the prediction samples and the prediction refinement values.

12 Claims, 14 Drawing Sheets

Related U.S. Application Data

(60) Provisional application No. 62/913,141, filed on Oct. 9, 2019.

(51) Int. Cl.
*H04N 19/132* (2014.01)
*H04N 19/139* (2014.01)
*H04N 19/176* (2014.01)
*H04N 19/513* (2014.01)
*H04N 19/577* (2014.01)
*H04N 19/70* (2014.01)

(52) U.S. Cl.
CPC ......... *H04N 19/139* (2014.11); *H04N 19/176* (2014.11); *H04N 19/513* (2014.11); *H04N 19/70* (2014.11)

(56) References Cited

U.S. PATENT DOCUMENTS

| | | | |
|---|---|---|---|
| 2022/0279165 A1* | 9/2022 | Jang | H04N 19/70 |
| 2023/0117813 A1* | 4/2023 | Deng | H04N 19/30 |

OTHER PUBLICATIONS

Kwai Inc., Xiu, Xiaoyu et al.,"CE4/9-related: Combined Test of JVET-O0593/JVET-O0252/JVET-O0281/JVET-O0615 on harmonization on BDOF and PROF", Joint Video Experts Team(JVET) of ITU-T SG 16 WP 3 and ISO/IEC JTC 1/SC 29/WG 11,JVET-O1142-v2, 15th Meeting: Gothenburg, SE,Jul. 3-12, 2019,(8p).

Kwai Inc., Xiu, Xiaoyu et al.,"Non-CE4: On BDOF and PROF parameter derivation", Joint Video Experts Team (JVET) of ITU-T SG 16 WP 3 and ISO/IECJTC 1/SC 29/WG 11, JVET-P0653-v1, 16th Meeting: Geneva, CH, Oct. 1-11, 2019, (8p).

LG Electronics Inc., Naeri Park et al., "Non-CE4: Corrections on parameter calculation for PROF and BDOF", Joint Video Experts Team (JVET) of ITU-T SG 16 WP 3 and ISO/IEC JTC 1/SC 29/WG 11, JVET-P0281-r1, 16th Meeting: Geneva, CH, Oct. 1-11, 2019,(17p).

Kwai Inc., Xiu X et al., "Non-CE4:On BDOF and PROF parameter derivation", Joint Video Experts Team (JVET) of ITU-T SG 16 WP 3 and ISO/IEC JTC 1/SC 29/WG 11, JVET-P0653-v1, 16th Meeting: Geneva, CH, Oct. 1-11, 2019,(6p).

Bross B et al: "Versatile video Coding (Draft 6)", Joint Video Experts Team (JVET) of ITU-T SG 16 WP 3 and ISO/IEC JTC 1/SC 29/WG 11, JVET-O2001-vE, 15th Meeting, Gothenburg, SE, Jul. 3-12, 2019,(456p).

Bytedance Inc., Liu et al.,"CE4-related: On MVD derivation in PROF", Joint Video Experts Team (JVET) of ITU-T SG 16 WP 3 and ISO/IEC JTC 1/SC 29/WG 11, JVET-P0491, 16th Meeting: Geneva, CH, Oct. 1-11, 2019,(4p).

Jianle Chen et al: "Algorithm description for Versatile video Coding and Test Model 6 (VTM 6)", Joint Video Experts Team (JVET) of ITU-T SG 16 WP 3 and ISO/IEC JTC 1/SC 29/WG 11,JVET-O2002-v2; 1Sth Meeting: Gothenburg, SE, Jul. 3-12, 2019, (88p).

International Search Report of International Application No. PCT Application No. PCT/US2020/055153 dated Jan. 26, 2021, (4p).

Xiaoyu Xiu et al., CE4-related: Harmonization of BDOF and PROF, JVET-O0593-r2, Joint Video Experts Team (JVET) of ITU-T SG 16 WP 3 and ISO/IEC JTC 1/SC 29/WG11, 15th Meeting: Gothenburg, SE, Jul. 3-12, 2019, (7p).

Xiaoyu Xiu et al., "Non-CE4: On BDOF and PROF Parameter Derivation", JVET-P0653_r1, Joint Video Experts Team (JVET) of ITU-T SG 16 WP 3 and ISO/IEC JTC 1/SC 29/WG, 16th Meeting: Geneva, CH, Oct. 1-11, 2019, (7p).

Xuewei Meng, Xuewei, et al., "Non-CE4: Harmonization of PRO, BDOF and DMVR Syntax", JVET-P0314-v2, Joint Video Experts Team (JVET) of ITU-T SG 16 WP 3 and ISO/IEC JTC 1/SC 29/WG, 16th Meeting: Geneva CH,Oct. 1-22, 2019, (7p).

* cited by examiner

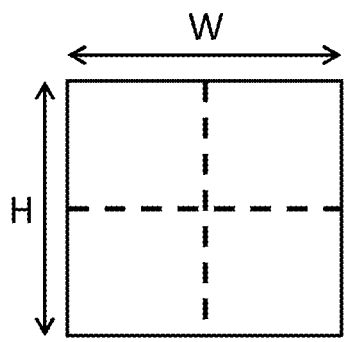
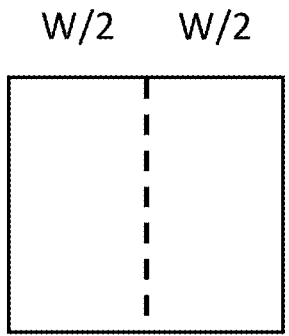
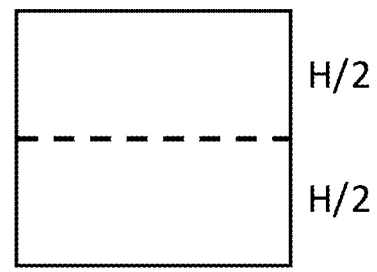
FIG. 3A   FIG. 3B   FIG. 3C
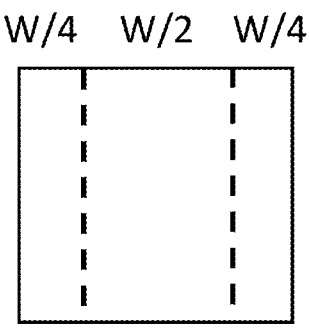
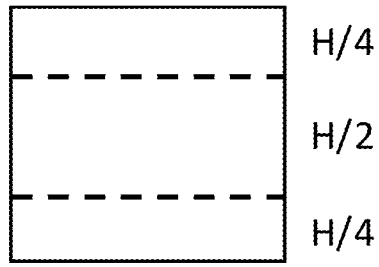
FIG. 3D   FIG. 3E
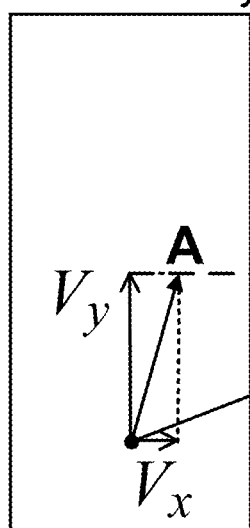
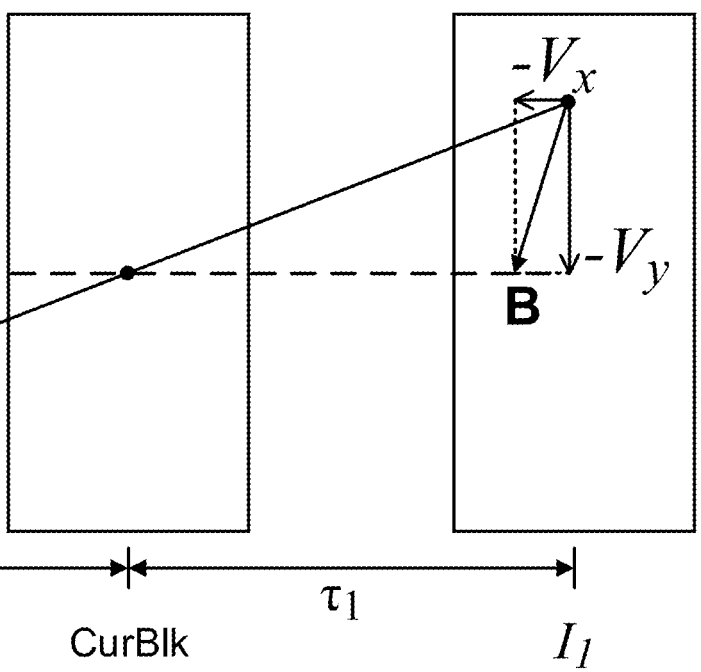
FIG. 4

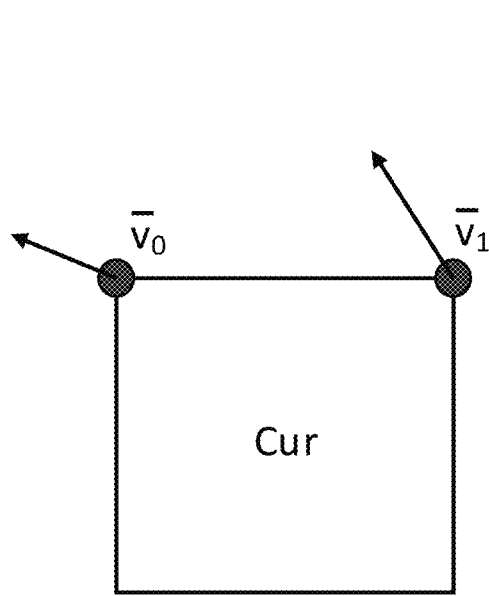
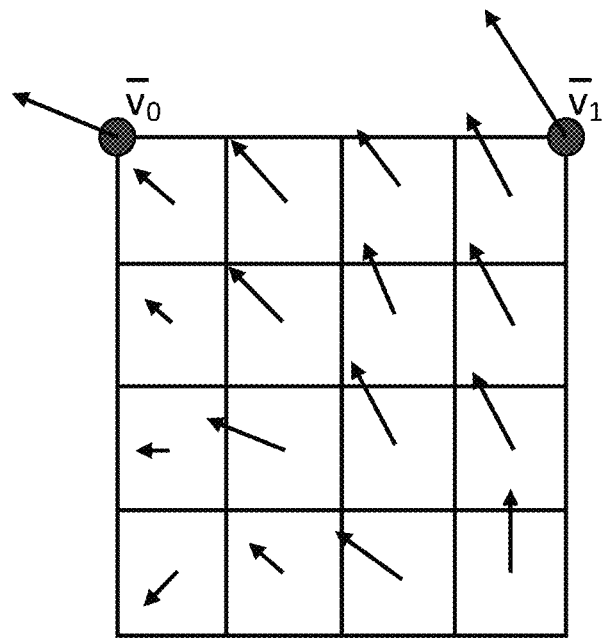
FIG. 5A  FIG. 5B
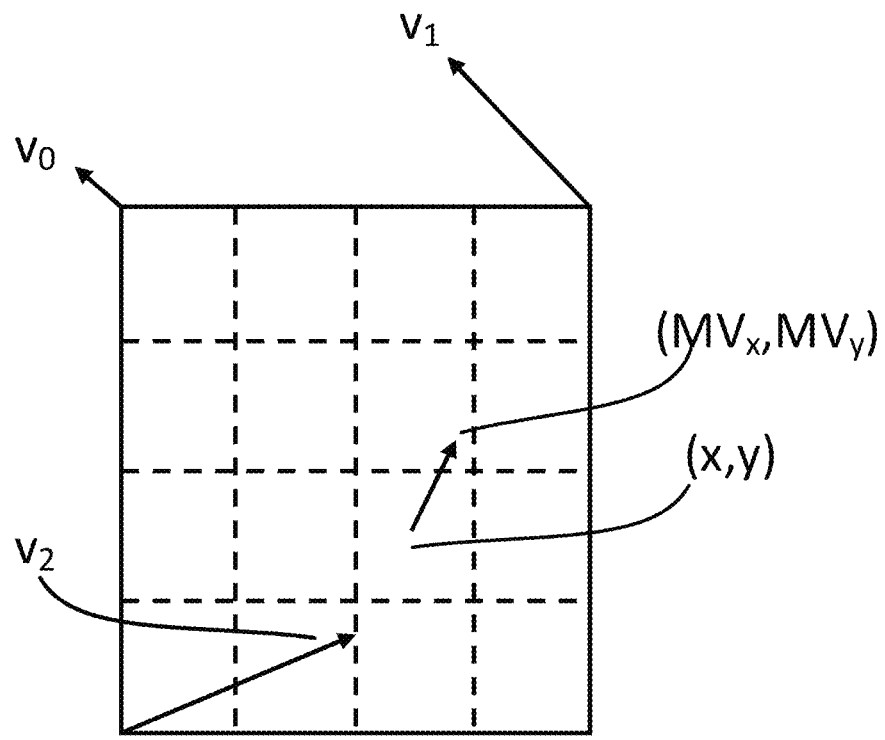
FIG. 6

--- 4X4 subblock boundaries

☐ Padded samples

METHODS AND APPARATUSES FOR PREDICTION REFINEMENT WITH OPTICAL FLOW, BI-DIRECTIONAL OPTICAL FLOW, AND DECODER-SIDE MOTION VECTOR REFINEMENT

CROSS-REFERENCE TO RELATED APPLICATIONS

This application is a continuation application of PCT application No. PCT/US2020/055153 filed on Oct. 9, 2020, which is based upon and claims priority to Provisional Application No. 62/913,141 filed on Oct. 9, 2019, the entire disclosures thereof are incorporated herein by reference for all purposes.

TECHNICAL FIELD

This disclosure is related to video coding and compression. More specifically, this disclosure relates to methods and apparatus on the two inter prediction tools that are investigated in the versatile video coding (VVC) standard, namely, prediction refinement with optical flow (PROF) and bi-directional optical flow (BDOF).

BACKGROUND

Various video coding techniques may be used to compress video data. Video coding is performed according to one or more video coding standards. For example, video coding standards include versatile video coding (VVC), joint exploration test model (JEM), high-efficiency video coding (H.265/HEVC), advanced video coding (H.264/AVC), moving picture expert group (MPEG) coding, or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality.

SUMMARY

Examples of the present disclosure provide methods and apparatus for bit-depth control for bi-directional optical flow.

According to a first aspect of the present disclosure, a bit-depth representation method of PROF is provided. In the method, a decoder may obtain a reference picture I associated with a video block within the video signal. The decoder may also obtain initial prediction samples I(i, j) of the video block from a reference block in the reference picture I. The i and j represent a coordinate of one sample within the video block. The decoder may further control internal PROF parameters of a PROF derivation process by applying right-shifting to the internal PROF parameters. The internal PROF parameters may include horizontal gradient values, vertical gradient values, horizontal motion difference values, and vertical motion difference values derived for samples in the video block. The decoder may also obtain prediction refinement values for the samples in the video block based on the PROF derivation process being applied to the video block based on the initial prediction samples I(i, j). The decoder may further obtain refined prediction samples of the video block based on the combination of the initial prediction samples and the prediction refinement values.

According to a second aspect of the present disclosure, a bit-depth control method of BDOF is provided. In the method, a decoder may obtain a first reference picture $I^{(0)}$ and a second reference picture $I^{(1)}$ associated with a video block. The first reference picture $I^{(0)}$ is before a current picture and the second reference picture $I^{(1)}$ is after the current picture in display order. The decoder may also obtain first prediction samples $I^{(0)}(i, j)$ of the video block from a reference block in the first reference picture $I^{(0)}$. The i and j represent a coordinate of one sample with the current picture. The decoder may further obtain second prediction samples $I^{(1)}(i, j)$ of the video block from a reference block in the second reference picture $I^{(1)}$ The decoder may also control internal BDOF parameters of a BDOF derivation process by applying shifting to the internal BDOF parameters. The internal BDOF parameters comprising horizontal gradient values and vertical gradient values derived based on the first prediction samples $I^{(0)}(i, j)$, the second prediction samples $I^{(1)}(i, j)$, sample differences between the first prediction samples $I^{(0)}(i, j)$ and the second prediction samples $I^{(1)}(i, j)$, and intermediate BDOF derivation parameters. The intermediate BDOF derivation parameters may include sGxdI, sGydI, sGx2, sGxGy, and sGy2 parameters. sGxdI and sGydI may include cross-correlation values between the horizontal gradient values and sample difference values, and between the vertical gradient values and the sample difference values. sGx2 and sGy2 may include auto-correlation values of the horizontal gradient values and the vertical gradient values. sGxGy may include the cross-correlation values between the horizontal gradient values and the vertical gradient values.

According to a third aspect of the present disclosure, a method of BDOF, PROF, and DMVR is provided. The method may include a decoder receiving three control flags in sequence parameter set (SPS). A first control flag indicates whether the BDOF is enabled for decoding video blocks in a current video sequence. A second control flag indicates whether the PROF is enabled for decoding the video blocks in the current video sequence. A third control flag indicates whether the DMVR is enabled for decoding the video blocks in the current video sequence. The decoder may also receive a first presence flag in the SPS when the first control flag is true, a second presence flag in the SPS when the second control flag is true and a third presence flag in the SPS when the third control flag is true. The decoder may further receive a first picture control flag in a picture header of each picture when the first presence flag in the SPS indicates that the BDOF is disabled for the video blocks in the picture. The decoder may also receive a second picture control flag in the picture header of each picture when the second presence flag in the SPS indicates that the PROF is disabled for the video blocks in the picture. The decoder may further receive a third picture control flag in the picture header of each picture when the third presence flag in the SPS indicates that the DMVR is disabled for the video blocks in the picture.

According to a fourth aspect of the present disclosure, a computing device is provided. The computing device may include one or more processors, a non-transitory computer-readable memory storing instructions executable by the one or more processors. The one or more processors may be configured to obtain a reference picture I associated with a video block within the video signal. The one or more processors may also be configured to obtain initial prediction samples I(i, j) of the video block from a reference block in the reference picture I. The i and j represent a coordinate of one sample within the video block. The one or more processors may further be configured to control internal PROF parameters of a PROF derivation process by applying right-shifting to the internal PROF parameters. The internal PROF parameters may include horizontal gradient values, vertical gradient values, horizontal motion difference values, and vertical motion difference values derived for samples in the video block. The one or more processors may also be configured to obtain prediction refinement values for the samples in the video block based on the PROF derivation process being applied to the video block based on the initial prediction samples I(i, j). The one or more processors may further be configured to obtain refined prediction samples of the video block based on the combination of the initial prediction samples and the prediction refinement values.

According to a fifth aspect of the present disclosure, a computing device is provided. The computing device may include one or more processors, a non-transitory computer-readable memory storing instructions executable by the one or more processors. The one or more processors may be configured to obtain a first reference picture $I^{(0)}$ and a second reference picture $I^{(1)}$ associated with a video block. The first reference picture $I^{(0)}$ is before a current picture and the second reference picture $I^{(1)}$ is after the current picture in display order. The one or more processors may further be configured to obtain first prediction samples $I^{(0)}(i, j)$ of the video block from a reference block in the first reference picture $I^{(0)}$. The i and j represent a coordinate of one sample with the current picture. The one or more processors may also be configured to obtain prediction refinement values for samples in the video block based on the PROF derivation process being applied to the video block based on the prediction samples I(i, j). The one or more processors may further be configured to obtain second prediction samples $I^{(1)}(i, j)$ of the video block from a reference block in the second reference picture $I^{(1)}$. The one or more processors may further be configured to control internal BDOF parameters of a BDOF derivation process by applying shifting to the internal BDOF parameters. The internal BDOF parameters comprising horizontal gradient values and vertical gradient values derived based on the first prediction samples $I^{(0)}(i, j)$, the second prediction samples $I^{(1)}(i, j)$, sample differences between the first prediction samples $I^{(0)}(i, j)$ and the second prediction samples $I^{(1)}(i, j)$, and intermediate BDOF derivation parameters. The intermediate BDOF derivation parameters may include sGxdI, sGydI, sGx2, sGxGy, and sGy2 parameters. The sGxdI and sGydI may include cross-correlation values between the horizontal gradient values and sample difference values, and between the vertical gradient values and the sample difference values. The sGx2 and sGy2 may include auto-correlation values of the horizontal gradient values and the vertical gradient values. The sGxGy may include the cross-correlation values between the horizontal gradient values and the vertical gradient values. The one or more processors may further be configured to obtain motion refinements for samples in the video block based on the BDOF being applied to the video block based on the first prediction samples $I^{(0)}(i, j)$ and the second prediction samples $I^{(1)}(i, j)$. The one or more processors may further be configured to obtain bi-prediction samples of the video block based on the motion refinements.

According to a sixth aspect of the present disclosure, a non-transitory computer-readable storage medium having stored therein instructions is provided. When the instructions are executed by one or more processors of the apparatus, the instructions may cause the apparatus to receive three control flags in sequence parameter set (SPS). A first control flag indicates whether a BDOF is enabled for decoding video blocks in a current video sequence. A second control flag indicates whether a PROF is enabled for decoding the video blocks in the current video sequence. A third control flag indicates whether a DMVR is enabled for decoding the video blocks in the current video sequence. The instructions may also cause the apparatus to receive a first presence flag in the SPS when the first control flag is true, a second presence flag in the SPS when the second control flag is true and a third presence flag in the SPS when the third control flag is true. The instructions may further cause the apparatus to receive a first picture control flag in a picture header of each picture when the first presence flag in the SPS indicates that the BDOF is disabled for the video blocks in the picture. The instructions may also cause the apparatus to receive a second picture control flag in the picture header of each picture when the second presence flag in the SPS indicates that the PROF is disabled for the video blocks in the picture. The instructions may further cause the apparatus to receive a third picture control flag in the picture header of each picture when the third presence flag in the SPS indicates that the DMVR is disabled for the video blocks in the picture.

It is to be understood that both the foregoing general description and the following detailed description are examples only and are not restrictive of the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

FIG. 3A is a diagram illustrating block partitions in a multi-type tree structure, according to an example of the present disclosure.

FIG. 3B is a diagram illustrating block partitions in a multi-type tree structure, according to an example of the present disclosure.

FIG. 3C is a diagram illustrating block partitions in a multi-type tree structure, according to an example of the present disclosure.

FIG. 3D is a diagram illustrating block partitions in a multi-type tree structure, according to an example of the present disclosure.

FIG. 3E is a diagram illustrating block partitions in a multi-type tree structure, according to an example of the present disclosure.

FIG. 4 is a diagram illustration of a bi-directional optical flow (BDOF) model, according to an example of the present disclosure.

FIG. 5A is an illustration of an affine model, according to an example of the present disclosure.

FIG. 5B is an illustration of an affine model, according to an example of the present disclosure.

FIG. 6 is an illustration of an affine model, according to an example of the present disclosure.

DETAILED DESCRIPTION

Figure 1:
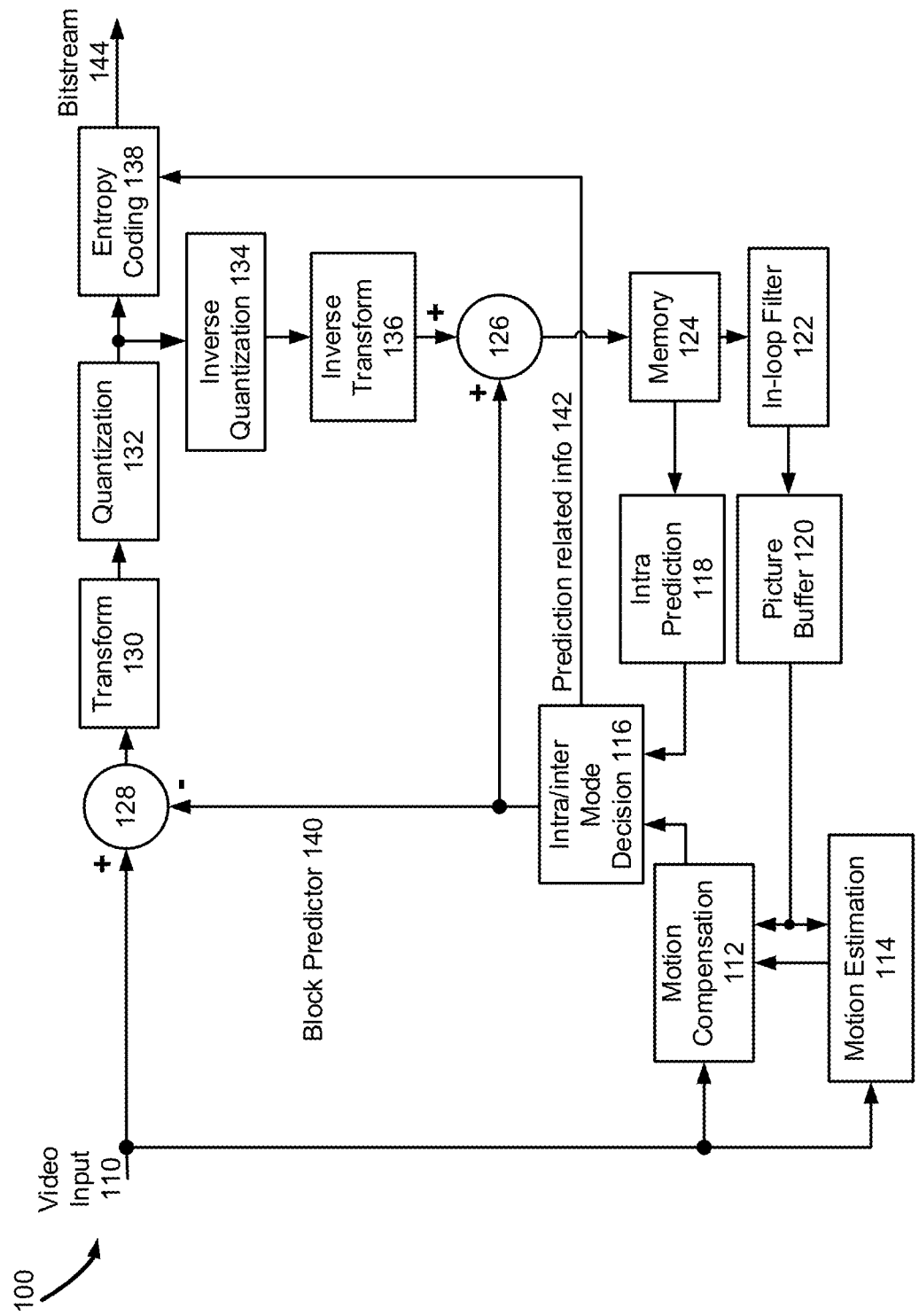
FIG. 1 is a block diagram of an encoder, according to an example of the present disclosure.

Reference will now be made in detail to example embodiments, examples of which are illustrated in the accompanying drawings. The following description refers to the accompanying drawings in which the same numbers in different drawings represent the same or similar elements unless otherwise represented. The implementations set forth in the following description of example embodiments do not represent all implementations consistent with the disclosure. Instead, they are merely examples of apparatuses and methods consistent with aspects related to the disclosure as recited in the appended claims.

The terminology used in the present disclosure is for the purpose of describing particular embodiments only and is not intended to limit the present disclosure. As used in the present disclosure and the appended claims, the singular forms "a," "an," and "the" are intended to include the plural forms as well, unless the context clearly indicates otherwise. It shall also be understood that the term "and/or" used herein is intended to signify and include any or all possible combinations of one or more of the associated listed items.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to a judgment" depending on the context.

The first version of the HEVC standard was finalized in October 2013, which offers approximately 50% bit-rate saving or equivalent perceptual quality compared to the prior generation video coding standard H.264/MPEG AVC. Although the HEVC standard provides significant coding improvements than its predecessor, there is evidence that superior coding efficiency can be achieved with additional coding tools over HEVC. Based on that, both VCEG and MPEG started the exploration work of new coding technologies for future video coding standardization, one Joint Video Exploration Team (JVET) was formed in October 2015 by ITU-T VECG and ISO/IEC MPEG to begin significant study of advanced technologies that could enable substantial enhancement of coding efficiency. One reference software called joint exploration model (JEM) was maintained by the JVET by integrating several additional coding tools on top of the HEVC test model (HM).

In October 2017, the joint call for proposals (CfP) on video compression with capability beyond HEVC was issued by ITU-T and ISO/IEC. In April 2018, 23 CfP responses were received and evaluated at the 10-th JVET meeting, which demonstrated compression efficiency gain over the HEVC around 40%. Based on such evaluation results, the JVET launched a new project to develop the new generation video coding standard that is named as Versatile Video Coding (VVC). In the same month, one reference software codebase, called VVC test model (VTM), was established for demonstrating a reference implementation of the VVC standard.

Like HEVC, the VVC is built upon the block-based hybrid video coding framework.

FIG. 1 shows a general diagram of a block-based video encoder for the VVC. Specifically, FIG. 1 shows a typical encoder 100. The encoder 100 has video input 110, motion compensation 112, motion estimation 114, intra/inter mode decision 116, block predictor 140, adder 128, transform 130, quantization 132, prediction related info 142, intra prediction 118, picture buffer 120, inverse quantization 134, inverse transform 136, adder 126, memory 124, in-loop filter 122, entropy coding 138, and bitstream 144.

In the encoder 100, a video frame is partitioned into a plurality of video blocks for processing. For each given video block, a prediction is formed based on either an inter prediction approach or an intra prediction approach.

A prediction residual, representing the difference between a current video block, part of video input 110, and its predictor, part of block predictor 140, is sent to a transform 130 from adder 128. Transform coefficients are then sent from the Transform 130 to a Quantization 132 for entropy reduction. Quantized coefficients are then fed to an Entropy Coding 138 to generate a compressed video bitstream. As shown in FIG. 1, prediction related information 142 from an intra/inter mode decision 116, such as video block partition info, motion vectors (MVs), reference picture index, and intra prediction mode, are also fed through the Entropy Coding 138 and saved into a compressed bitstream 144. Compressed bitstream 144 includes a video bitstream.

In the encoder 100, decoder-related circuitries are also needed in order to reconstruct pixels for the purpose of prediction. First, a prediction residual is reconstructed through an Inverse Quantization 134 and an Inverse Transform 136. This reconstructed prediction residual is combined with a Block Predictor 140 to generate un-filtered reconstructed pixels for a current video block.

Spatial prediction (or "intra prediction") uses pixels from samples of already coded neighboring blocks (which are called reference samples) in the same video frame as the current video block to predict the current video block.

Temporal prediction (also referred to as "inter prediction") uses reconstructed pixels from already-coded video pictures to predict the current video block. Temporal prediction reduces temporal redundancy inherent in the video signal. The temporal prediction signal for a given coding unit (CU) or coding block is usually signaled by one or more MVs, which indicate the amount and the direction of motion between the current CU and its temporal reference. Further, if multiple reference pictures are supported, one reference picture index is additionally sent, which is used to identify from which reference picture in the reference picture storage, the temporal prediction signal comes from.

Motion estimation 114 intakes video input 110 and a signal from picture buffer 120 and output, to motion compensation 112, a motion estimation signal. Motion compensation 112 intakes video input 110, a signal from picture buffer 120, and motion estimation signal from motion estimation 114 and output to intra/inter mode decision 116, a motion compensation signal.

After spatial and/or temporal prediction is performed, an intra/inter mode decision 116 in the encoder 100 chooses the best prediction mode, for example, based on the rate-distortion optimization method. The block predictor 140 is then subtracted from the current video block, and the resulting prediction residual is de-correlated using the transform 130 and the quantization 132. The resulting quantized residual coefficients are inverse quantized by the inverse quantization 134 and inverse transformed by the inverse transform 136 to form the reconstructed residual, which is then added back to the prediction block to form the reconstructed signal of the CU. Further in-loop filtering 122, such as a deblocking filter, a sample adaptive offset (SAO), and/or an adaptive in-loop filter (ALF) may be applied on the reconstructed CU before it is put in the reference picture storage of the picture buffer 120 and used to code future video blocks. To form the output video bitstream 144, coding mode (inter or intra), prediction mode information, motion information, and quantized residual coefficients are all sent to the entropy coding unit 138 to be further compressed and packed to form the bitstream.

FIG. 1 gives the block diagram of a generic block-based hybrid video encoding system. The input video signal is processed block by block (called CUs). In VTM-1.0, a CU can be up to 128×128 pixels. However, different from the HEVC, which partitions blocks only based on quad-trees, in the VVC, one coding tree unit (CTU) is split into CUs to adapt to varying local characteristics based on quad/binary/ternary-tree. Additionally, the concept of multiple partition unit type in the HEVC is removed, i.e., the separation of CU, prediction unit (PU) and transform unit (TU) does not exist in the VVC anymore; instead, each CU is always used as the basic unit for both prediction and transform without further partitions. In the multi-type tree structure, one CTU is firstly partitioned by a quad-tree structure. Then, each quad-tree leaf node can be further partitioned by a binary and ternary tree structure. As shown in FIGS. 3A, 3B, 3C, 3D, and 3E, there are five splitting types, quaternary partitioning, horizontal binary partitioning, vertical binary partitioning, horizontal ternary partitioning, and vertical ternary partitioning.

FIG. 3A shows a diagram illustrating block quaternary partition in a multi-type tree structure, in accordance with the present disclosure.

FIG. 3B shows a diagram illustrating block vertical binary partition in a multi-type tree structure, in accordance with the present disclosure.

FIG. 3C shows a diagram illustrating block horizontal binary partition in a multi-type tree structure, in accordance with the present disclosure.

FIG. 3D shows a diagram illustrating block vertical ternary partition in a multi-type tree structure, in accordance with the present disclosure.

FIG. 3E shows a diagram illustrating block horizontal ternary partition in a multi-type tree structure, in accordance with the present disclosure.

In FIG. 1, spatial prediction and/or temporal prediction may be performed. Spatial prediction (or "intra prediction") uses pixels from the samples of already coded neighboring blocks (which are called reference samples) in the same video picture/slice to predict the current video block. Spatial prediction reduces spatial redundancy inherent in the video signal. Temporal prediction (also referred to as "inter prediction" or "motion compensated prediction") uses reconstructed pixels from the already coded video pictures to predict the current video block. Temporal prediction reduces temporal redundancy inherent in the video signal. Temporal prediction signal for a given CU is usually signaled by one or more motion vectors (MVs) which indicate the amount and the direction of motion between the current CU and its temporal reference. Also, if multiple reference pictures are supported, one reference picture index is additionally sent, which is used to identify from which reference picture in the reference picture store the temporal prediction signal comes. After spatial and/or temporal prediction, the mode decision block in the encoder chooses the best prediction mode, for example based on the rate-distortion optimization method. The prediction block is then subtracted from the current video block; and the prediction residual is de-correlated using transform and quantized. The quantized residual coefficients are inverse quantized and inverse transformed to form the reconstructed residual, which is then added back to the prediction block to form the reconstructed signal of the CU. Further, in-loop filtering, such as deblocking filter, sample adaptive offset (SAO) and adaptive in-loop filter (ALF), may be applied to the reconstructed CU before it is put in the reference picture store and used to code future video blocks. To form the output video bitstream, coding mode (inter or intra), prediction mode information, motion information, and quantized residual coefficients are all sent to the entropy coding unit to be further compressed and packed to form the bit-stream.

Figure 2:
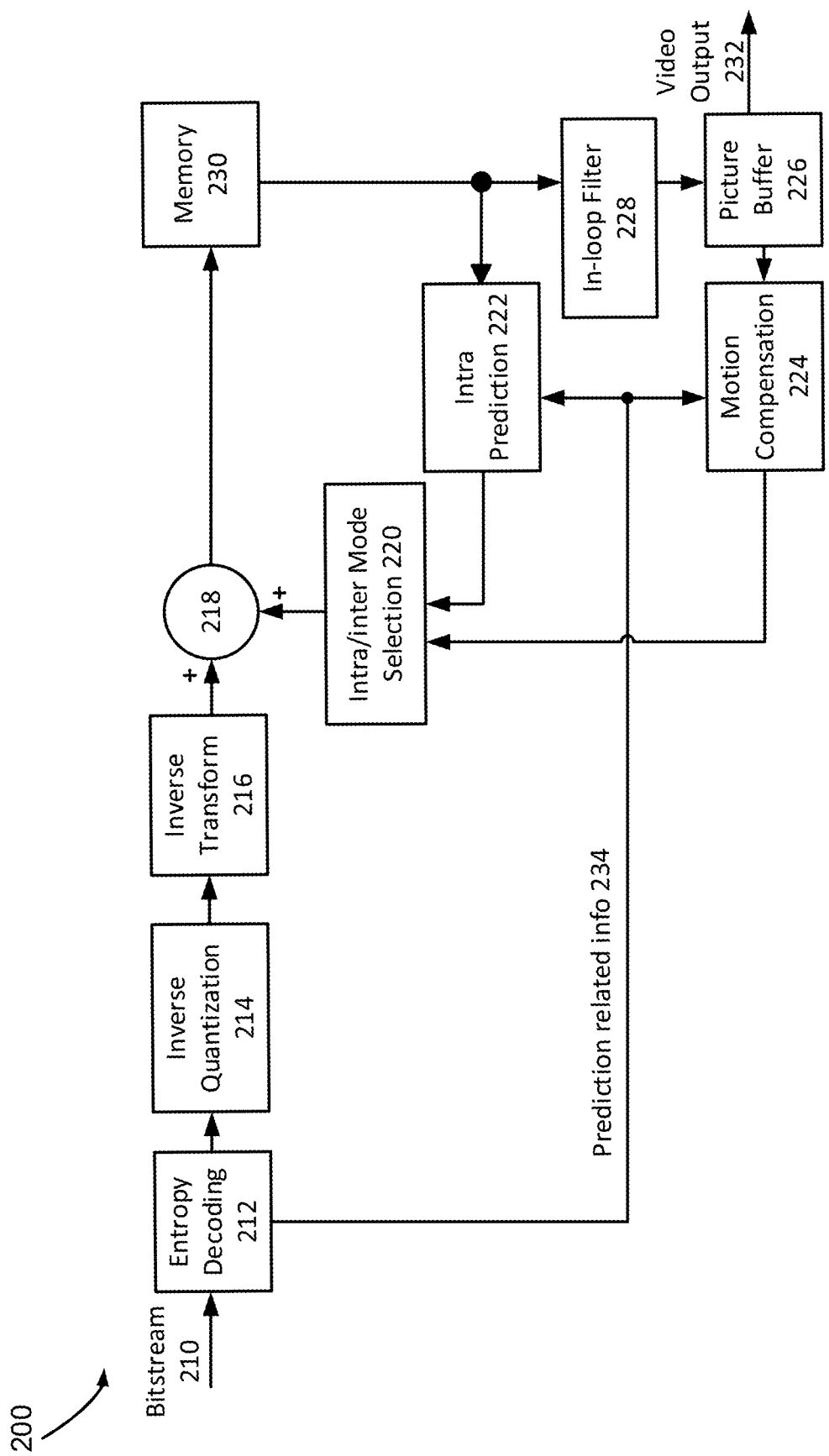
FIG. 2 is a block diagram of a decoder, according to an example of the present disclosure.

FIG. 2 shows a general block diagram of a video decoder for the VVC. Specifically, FIG. 2 shows a typical decoder 200 block diagram. Decoder 200 has bitstream 210, entropy decoding 212, inverse quantization 214, inverse transform 216, adder 218, intra/inter mode selection 220, intra prediction 222, memory 230, in-loop filter 228, motion compensation 224, picture buffer 226, prediction related info 234, and video output 232.

Decoder 200 is similar to the reconstruction-related section residing in the encoder 100 of FIG. 1. In the decoder 200, an incoming video bitstream 210 is first decoded through an Entropy Decoding 212 to derive quantized coefficient levels and prediction-related information. The quantized coefficient levels are then processed through an Inverse Quantization 214 and an Inverse Transform 216 to obtain a reconstructed prediction residual. A block predictor mechanism, implemented in an Intra/inter Mode Selector 220, is configured to perform either an Intra Prediction 222 or a Motion Compensation 224, based on decoded prediction information. A set of unfiltered reconstructed pixels is obtained by summing up the reconstructed prediction residual from the Inverse Transform 216 and a predictive output generated by the block predictor mechanism, using a summer 218.

The reconstructed block may further go through an In-Loop Filter 228 before it is stored in a Picture Buffer 226, which functions as a reference picture store. The reconstructed video in the Picture Buffer 226 may be sent to drive a display device, as well as used to predict future video blocks. In situations where the In-Loop Filter 228 is turned on, a filtering operation is performed on these reconstructed pixels to derive a final reconstructed Video Output 232.

FIG. 2 gives a general block diagram of a block-based video decoder. The video bit-stream is first entropy decoded at the entropy decoding unit. The coding mode and prediction information are sent to either the spatial prediction unit (if intra coded) or the temporal prediction unit (if inter-coded) to form the prediction block. The residual transform coefficients are sent to the inverse quantization unit and inverse transform unit to reconstruct the residual block. The prediction block and the residual block are then added together. The reconstructed block may further go through in-loop filtering before it is stored in reference picture storage. The reconstructed video in reference picture storage is then sent out to drive a display device, as well as used to predict future video blocks.

In general, the basic inter prediction techniques that are applied in the VVC are kept the same as that of the HEVC except that several modules are further extended and/or enhanced. In particular, for all the preceding video standards, one coding block can only be associated with one single MV when the coding block is uni-predicted or two MVs when the coding block is bi-predicted. Because of such limitation of the conventional block-based motion compensation, small motion can still remain within the prediction samples after motion compensation, therefore negatively affecting the overall efficiency of motion compensation. To improve both the granularity and precision of the MVs, two sample-wise refinement methods based on optical flow, namely bi-directional optical flow (BDOF) and prediction refinement with optical flow (PROF) for affine mode, are currently investigated for the VVC standard. In the following, the main technical aspects of the two inter coding tools are briefly reviewed.

Bi-Directional Optical Flow

In the VVC, BDOF is applied to refine the prediction samples of bi-predicted coding blocks. Specifically, as shown in FIG. 4, the BDOF is a sample-wise motion refinement that is performed on top of the block-based motion-compensated predictions when bi-prediction is used.

FIG. 4 shows an illustration of a BDOF model, in accordance with the present disclosure.

The motion refinement ($v_x$, $v_y$) of each 4×4 sub-block is calculated by minimizing the difference between L0 and L1 prediction samples after the BDOF is applied inside one 6×6 window $\Omega$ around the sub-block. Specifically, the value of ($v_x$, $v_y$) is derived as $$v_x = S_1 > 0 ? clip3(-th_{BDOF}, th_{BDOF}, -((S_3 \cdot 2^3) \gg \lfloor \log_2 S_1 \rfloor)) : 0$$

$$v_y = S_5 > 0 ? clip3(-th_{BDOF}, th_{BDOF}, -((S_6 \cdot 2^3 - ((v_x S_{2,m}) \ll n_{S_2} + v_x S_{2,s})/2) \gg \lfloor \log_2 S_5 \rfloor)) : 0 \quad (1)$$

where $\lfloor \cdot \rfloor$ is the floor function; clip3(min, max, x) is a function that clips a given value x inside the range of [min, max]; the symbol » represents bitwise right shift operation; the symbol « represents bitwise left shift operation; $th_{BDOF}$ is the motion refinement threshold to prevent the propagated errors due to irregular local motion, which is equal to 1«max(5, bit-depth-7)., where bit-depth is the internal bit-depth. In (1), $S_{2,m} = S_2 \gg n_{S_2}$, $S_{2,s} = S_2 \& (2^{n_{S_2}} - 1)$.

The values of $S_1$, $S_2$, $S_3$, $S_5$ and $S_6$ are calculated as $$S_1 = \sum_{(i,j)\in\Omega} \psi_x(i, j) \cdot \psi_x(i, j), \quad (2)$$

$$S_2 = \sum_{(i,j)\in\Omega} \psi_x(i, j) \cdot \psi_y(i, j)$$

$$S_3 = \sum_{(i,j)\in\Omega} \theta(i, j) \cdot \psi_x(i, j)$$

$$S_5 = \sum_{(i,j)\in\Omega} \psi_y(i, j) \cdot \psi_y(i, j)$$

$$S_6 = \sum_{(i,j)\in\Omega} \theta(i, j) \cdot \psi_y(i, j)$$

where $$\psi_x(i, j) = \left(\frac{\partial I^{(1)}}{\partial x}(i, j) + \frac{\partial I^{(0)}}{\partial x}(i, j)\right) \gg \max(1, \text{bit-depth} - 11) \quad (3)$$

$$\psi_y(i, j) = \left(\frac{\partial I^{(1)}}{\partial y}(i, j) + \frac{\partial I^{(0)}}{\partial y}(i, j)\right) \gg \max(1, \text{bit-depth} - 11)$$

$$\theta(i, j) = \left(I^{(1)}(i, j) \gg \max(4, \text{bit-depth} - 8)\right) - \left(I^{(0)}(i, j) \gg \max(4, \text{bit-depth} - 8)\right)$$

where $I^{(k)}(i, j)$ are the sample value at coordinate (i, j) of the prediction signal in list k, k=0,1, which are generated at intermediate high precision (i.e., 16-bit);

$$\frac{\partial I^{(k)}}{\partial x}(i, j) \text{ and } \frac{\partial I^{(k)}}{\partial y}(i, j)$$

are the horizontal and vertical gradients of the sample that are obtained by directly calculating the difference between its two neighboring samples, i.e., $$\frac{\partial I^{(k)}}{\partial x}(i, j) = \left(I^{(k)}(i+1, j) - I^{(k)}(i-1, j)\right) \gg \max(6, \text{bit-depth} - 6) \quad (4)$$

$$\frac{\partial I^{(k)}}{\partial y}(i, j) = \left(I^{(k)}(i, j+1) - I^{(k)}(i, j-1)\right) \gg \max(6, \text{bit-depth} - 6)$$

Based on the motion refinement derived in (1), the final bi-prediction samples of the CU are calculated by interpolating the L0/L1 prediction samples along the motion trajectory based on the optical flow model, as indicated by $$pred_{BDOF}(x, y) = \left(I^{(0)}(x, y) + I^{(1)}(x, y) + b + o_{offset}\right) \gg \text{shift} \quad (5)$$

$$b = rnd\left(\left(v_x\left(\frac{\partial I^{(1)}(x, y)}{\partial x} - \frac{\partial I^{(0)}(x, y)}{\partial x}\right)\right) / 2\right) +$$

-continued $$rnd\left(\left(v_y\left(\frac{\partial I^{(1)}(x,y)}{\partial y} - \frac{\partial I^{(0)}(x,y)}{\partial y}\right)\right)/2\right)$$

where shift and $o_{offset}$ are the right shift value and the offset value that are applied to combine the L0 and L1 prediction signals for bi-prediction, which are equal to 15−bit-depth and 1«(14−bit-depth)+2·(1«13), respectively. Based on the above bit-depth control method, it is guaranteed that the maximum bit-depth of the intermediate parameters of the whole BDOF process do not exceed 32-bit and the largest input to the multiplication is within 15-bit, i.e., one 15-bit multiplier is sufficient for BDOF implementations.

Affine Mode

In HEVC, only translation motion model is applied for motion compensated prediction. While in the real world, there are many kinds of motion, e.g., zoom in/out, rotation, perspective motions and other irregular motions. In the VVC, affine motion compensated prediction is applied by signaling one flag for each inter coding block to indicate whether the translation motion or the affine motion model is applied for inter prediction. In the current VVC design, two affine modes, including 4-paramter affine mode and 6-parameter affine mode, are supported for one affine coding block.

The 4-parameter affine model has the following parameters: two parameters for translation movement in horizontal and vertical directions respectively, one parameter for zoom motion and one parameter for rotation motion for both directions. Horizontal zoom parameter is equal to vertical zoom parameter. The horizontal rotation parameter is equal to vertical rotation parameter. To achieve a better accommodation of the motion vectors and affine parameter, in the VVC, those affine parameters are translated into two MVs (which are also called control point motion vector (CPMV)) located at the top-left corner and top-right corner of a current block. As shown in FIGS. 5A and 5B, the affine motion field of the block is described by two control point MVs ($V_0$, $V_1$).

FIG. 5A shows an illustration of a 4-parameter affine model, in accordance with the present disclosure.

FIG. 5B shows an illustration of a 4-parameter affine model, in accordance with the present disclosure.

Based on the control point motion, the motion field ($v_x$, $v_y$) of one affine coded block is described as $$v_x = \frac{(v_{1x}-v_{0x})}{w}x - \frac{(v_{1y}-v_{0y})}{w}y + v_{0x}$$

$$v_y = \frac{(v_{1y}-v_{0y})}{w}x + \frac{(v_{1x}-v_{0x})}{w}y + v_{0y}$$

(6)

The 6-parameter affine mode has following parameters: two parameters for translation movement in horizontal and vertical directions respectively, one parameter for zoom motion and one parameter for rotation motion in horizontal direction, one parameter for zoom motion and one parameter for rotation motion in vertical direction. The 6-parameter affine motion model is coded with three MVs at three CPMVs.

FIG. 6 shows an illustration of a 6-parameter affine model, in accordance with the present disclosure.

As shown in FIG. 6, three control points of one 6-parameter affine block are located at the top-left, top-right, and bottom left corner of the block. The motion at top-left control point is related to translation motion, and the motion at top-right control point is related to rotation and zoom motion in horizontal direction, and the motion at bottom-left control point is related to rotation and zoom motion in vertical direction. Compared to the 4-parameter affine motion model, the rotation and zoom motion in horizontal direction of the 6-paramter may not be same as those motion in vertical direction. Assuming ($V_0$, $V_1$, $V_2$) are the MVs of the top-left, top-right and bottom-left corners of the current block in FIG. 6, the motion vector of each sub-block ($v_x$, $v_y$) is derived using three MVs at control points as:

$$v_x = v_{0x} + (v_{1x}-v_{0x})*\frac{x}{w} + (v_{2x}-v_{0x})*\frac{y}{h}$$

$$v_y = v_{0y} + (v_{1y}-v_{0y})*\frac{x}{w} + (v_{2y}-v_{0y})*\frac{y}{h}$$

(7)

Prediction Refinement with Optical Flow for Affine Mode

To improve affine motion compensation precision, the PROF is currently investigated in the current VVC which refines the sub-block based affine motion compensation based on the optical flow model. Specifically, after performing the sub-block-based affine motion compensation, luma prediction sample of one affine block is modified by one sample refinement value derived based on the optical flow equation. In details, the operations of the PROF can be summarized as the following four steps:

Step one: The sub-block-based affine motion compensation is performed to generate sub-block prediction I(i, j) using the sub-block MVs as derived in (6) for 4-parameter affine model and (7) for 6-parameter affine model.

Step two: The spatial gradients $g_x(i, j)$ and $g_y(i, j)$ of each prediction samples are calculated as $$g_x(i,j) = (I(i+1,j) - I(i-1,j)) \gg (\max(2, 14-\text{bit-depth})) - 4) \quad (8)$$

$$g_y(i,j) = (I(i,j+1) - I(i,j-1)) \gg (\max(2, 14-\text{bit-depth})) - 4)$$

To calculate the gradients, one additional row/column of prediction samples need to be generated on each side of one sub-block. To reduce the memory bandwidth and complexity, the samples on the extended borders are copied from the nearest integer pixel position in the reference picture to avoid additional interpolation processes.

Step three: The luma prediction refinement value is calculated by $$\Delta I(i,j)=g_x(i,j)*\Delta v_x(i,j)+g_y(i,j)*\Delta v_y(i,j) \quad (9)$$

where the $\Delta v(i, j)$ is the difference between pixel MV computed for sample location (i, j), denoted by v(i, j), and the sub-block MV of the sub-block where the pixel (i, j) locates at. Additionally, in the current PROF design, after adding the prediction refinement to the original prediction sample, one clipping operation is performed to clip the value of the refined prediction sample to be within 15-bit, i.e., $$I'(i,j)=I(i,j)+\Delta I(i,j)$$

$$I'(i,j)=\text{clip3}(-2^{14},2^{14}-1,I'(i,j))$$

where I(i,j) and I'(i, j) are the original and refined prediction sample at location (i,j), respectively.

Figure 7:
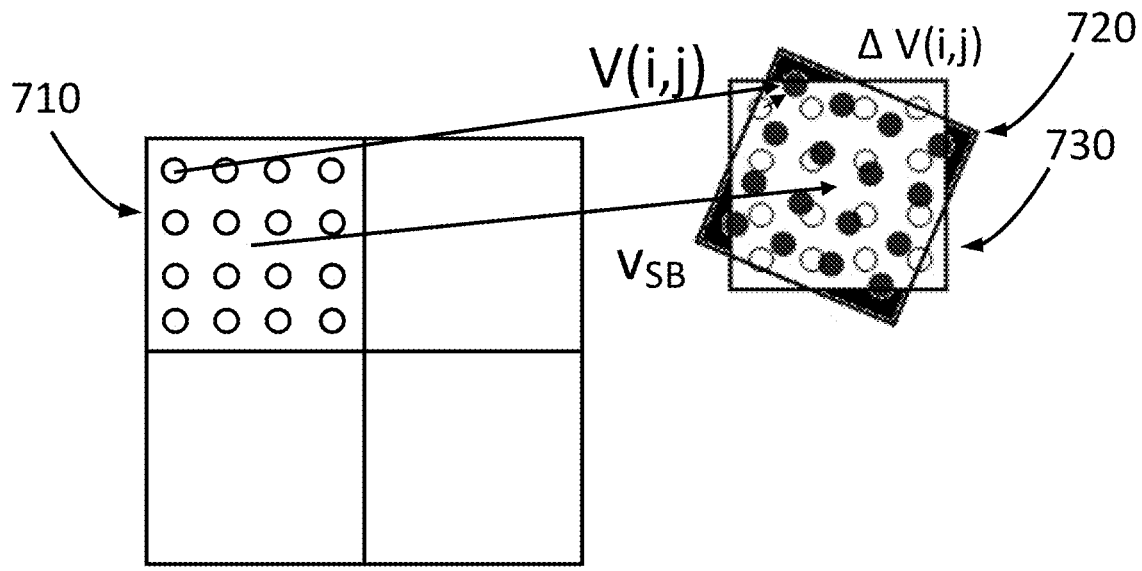
FIG. 7 is an illustration of a prediction refinement with optical flow (PROF), according to an example of the present disclosure.

FIG. 7 illustrates the PROF process for the affine mode, in accordance with the present disclosure. FIG. 7 includes block 710, block 720, and block 730. Block 730 is a rotated block of block 720.

Because the affine model parameters and the pixel location relative to the sub-block center are not changed from sub-block to sub-block, $\Delta v(i, j)$ can be calculated for the first sub-block, and reused for other sub-blocks in the same CU. Let $\Delta x$ and $\Delta y$ be the horizontal and vertical offset from the sample location (i, j) to the center of the sub-block that the sample belongs to, $\Delta v(i, j)$ can be derived as $$\Delta v_x(i,j) = c*\Delta x + d*\Delta y$$

$$\Delta v_y(i,j) = e*\Delta x + f*\Delta y \qquad (10)$$

Based on the affine sub-block MV derivation equations (6) and (7), the MV difference $\Delta v(i, j)$ can be derived. Specifically, for 4-parameter affine model, $$\begin{cases} c = f = \dfrac{v_{1x} - v_{0x}}{w} \\ e = -d = \dfrac{v_{1y} - v_{0y}}{w} \end{cases}$$

For the 6-parameter affine model, $$\begin{cases} c = \dfrac{v_{1x} - v_{0x}}{w} \\ d = \dfrac{v_{2x} - v_{0x}}{h} \\ e = \dfrac{v_{1y} - v_{0y}}{w} \\ f = \dfrac{v_{2y} - v_{0y}}{h} \end{cases}$$

where $(v_{0x}, v_{0y})$, $(v_{1x}, v_{1y})$, $(v_{2x}, v_{2y})$ are the top-left, top-right and bottom-left control point MVs of the current coding block, w and h are the width and height of the block. In the existing PROF design, the MV difference $\Delta v_x$ and $\Delta v_y$ are always derived at the precision of 1/32-pel.

Local Illumination Compensation

Local illumination compensation (LIC) is a coding tool that is used to address the issue of local illumination changes that exist in-between temporal neighboring pictures. A pair of weight and offset parameters is applied to the reference samples to obtain the prediction samples of one current block. The general mathematical model is given as $$P[x] = \alpha * P_r[x+v] + \beta \qquad (11)$$

where $P_r[x+v]$ is the reference block indicated by the motion vector v, $[\alpha, \beta]$ is the corresponding pair of weight and offset parameters for the reference block and P[x] is the final prediction block. The pair of the weight and offset parameters are estimated using the least linear mean square error (LLMSE) algorithm based on the template (i.e., neighboring reconstructed samples) of the current block and the reference block of the template (which is derived using the motion vector of the current block). By minimizing the mean square difference between the template samples and the reference samples of the template, the mathematical representation of $\alpha$ and $\beta$ can be derived as follows $$\alpha = \dfrac{I \cdot \sum_{i=1}^{I} (P_c[x_i] \cdot P_r[x_i]) - \sum_{i=1}^{I} (P_c[x_i]) \cdot \sum_{i=1}^{I} (P_r[x_i])}{I \cdot \sum_{i=1}^{I} (P_r[x_i] \cdot P_r[x_i]) - \left(\sum_{i=1}^{I} P_r[x_i]\right)^2} \qquad (12)$$

$$\beta = \dfrac{\sum_{i=1}^{I} (P_c[x_i]) - \alpha \cdot \sum_{i=1}^{I} (P_r[x_i])}{I}$$

Where I represent the number of samples in the template. $P_c[x_i]$ is the i-th sample of the current block's template and $P_r[x_i]$ is the reference sample of the i-th template sample based on the motion vector v.

Figure 17A:
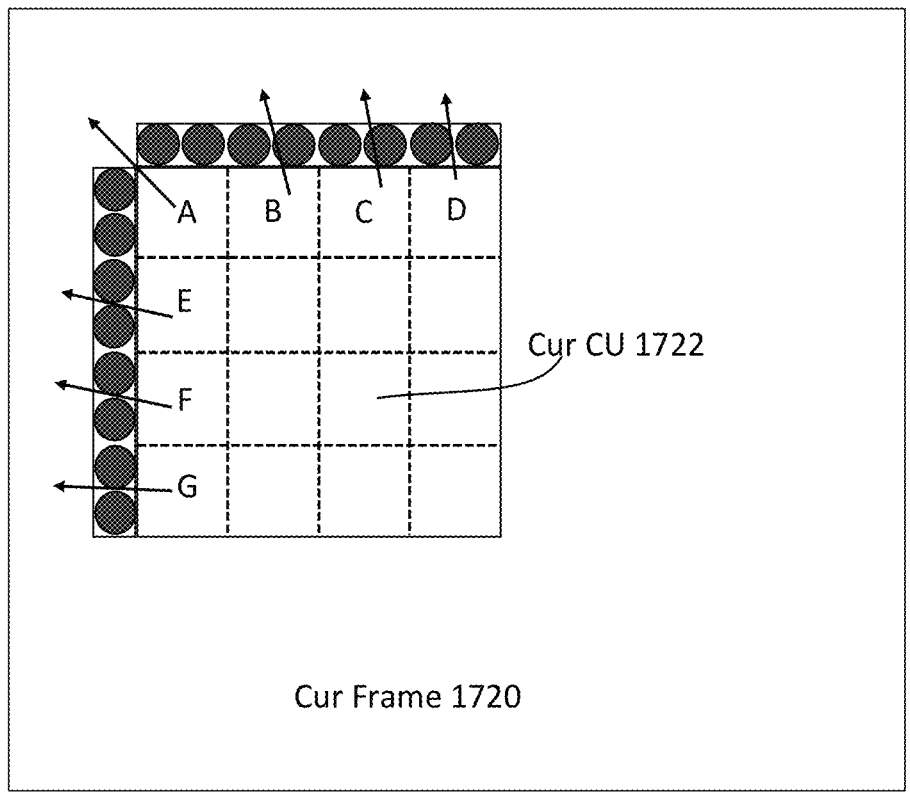
FIG. 17A is an illustration of deriving template samples for affine mode, according to an example of the present disclosure.
Figure 17B:
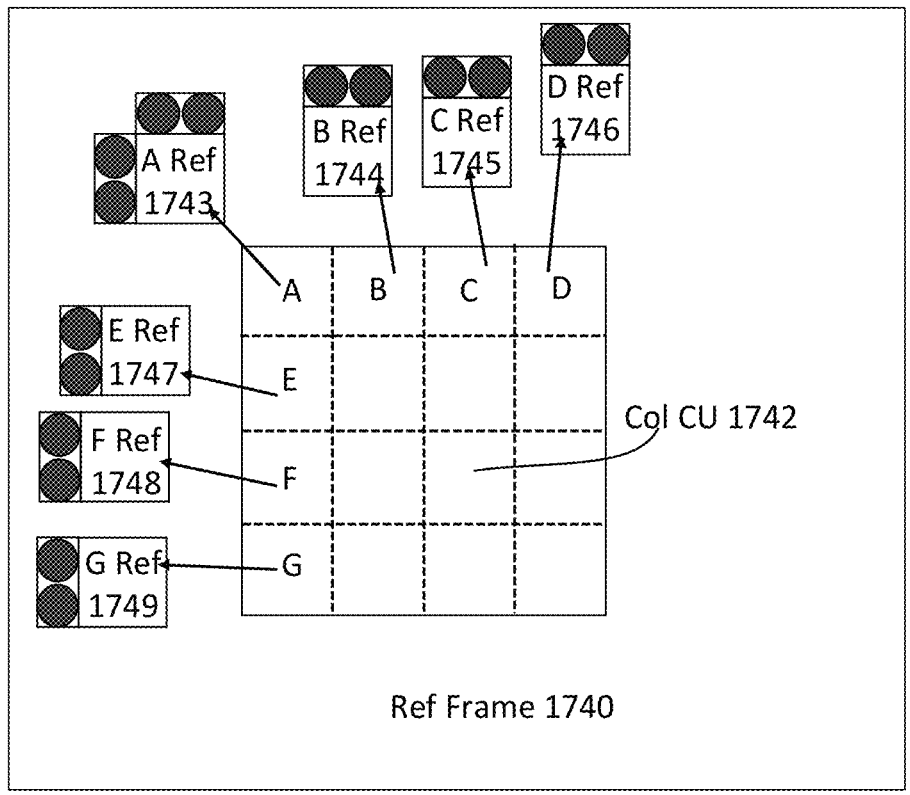
FIG. 17B is an illustration of deriving template samples for affine mode, according to an example of the present disclosure.

In addition to being applied to regular inter blocks which at most contain one motion vector for each prediction direction (L0 or L1), LIC is also applied to affine mode coded blocks where one coding block is further split into multiple smaller subblocks and each subblock may be associated with different motion information. To derive the reference samples for the LIC of an affine mode coded block, as shown in FIGS. 17A and 17B (described below), the reference samples in the top template of one affine coding block are fetched using the motion vector of each subblock in the top subblock row while the reference samples in the left template are fetched using the motion vectors of the subblocks in the left subblock column. After that, the same LLMSE derivation method as shown in (12) is applied to derive the LIC parameters based on the composite template.

FIG. 17A shows an illustration for deriving template samples for an affine mode, in accordance with the present disclosure. The illustration contains Cur Frame 1720 and Cur CU 1722. Cur Frame 1720 is the current frame. Cur CU 1722 is the current coding unit.

FIG. 17B shows an illustration for deriving template samples for an affine mode. The illustration contains Ref Frame 1740, Col CU 1742, A Ref 1743, B Ref 1744, C Ref 1745, D Ref 1746, E Ref 1747, F Ref 1748, and G Ref 1749. Ref Frame 1740 is the reference frame. Col CU 1742 is the collocated coding unit. A Ref 1743, B Ref 1744, C Ref 1745, D Ref 174,6 E Ref 1747, F Ref 1748, and G Ref 1749 are reference samples.

Inefficiencies of Prediction Refinement with Optical Flow for Affine Mode

Although the PROF can enhance the coding efficiency of affine mode, its design can still be further improved. Especially, given the fact that both PROF and BDOF are built upon the optical flow concept, it is highly desirable to harmonize the designs of the PROF and the BDOF as much as possible such that the PROF can maximally leverage the existing logics of the BDOF to facilitate hardware implementations. Based on such consideration, the following inefficiencies on the interaction between the current PROF and BDOF designs are identified in this disclosure.

First, as described in the section "prediction refinement with optical flow for affine mode", in equation (8), the precision of gradients is determined based on the internal bit-depth. On the other hand, the MV difference, i.e., $\Delta v_x$ and $\Delta v_y$, are always derived at the precision of 1/32-pel. Correspondingly, based on the equation (9), the precision of the derived PROF refinement is dependent on the internal bit-depth. However, similar to the BDOF, the PROF is applied on top of the prediction sample values at intermediate high bit-depth (i.e., 16-bit) in order to keep higher PROF derivation precision. Therefore, regardless of the internal coding bit-depth, the precision of the prediction refinements derived by the PROF should match that of the intermediate prediction samples, i.e., 16-bit. In other words, the representation bit-depths of the MV difference and gradients in the existing PROF design are not perfectly matched to derive accurate prediction refinements relative to the prediction sample precision (i.e., 16-bit). Meanwhile, based on the comparison of equations (1), (4) and (8), the existing PROF and BDOF use different precisions to represent the sample gradients and the MV difference. As pointed out earlier, such non-unified design is undesirable for hardware because the existing BDOF logic cannot be reused.

Figure 8:
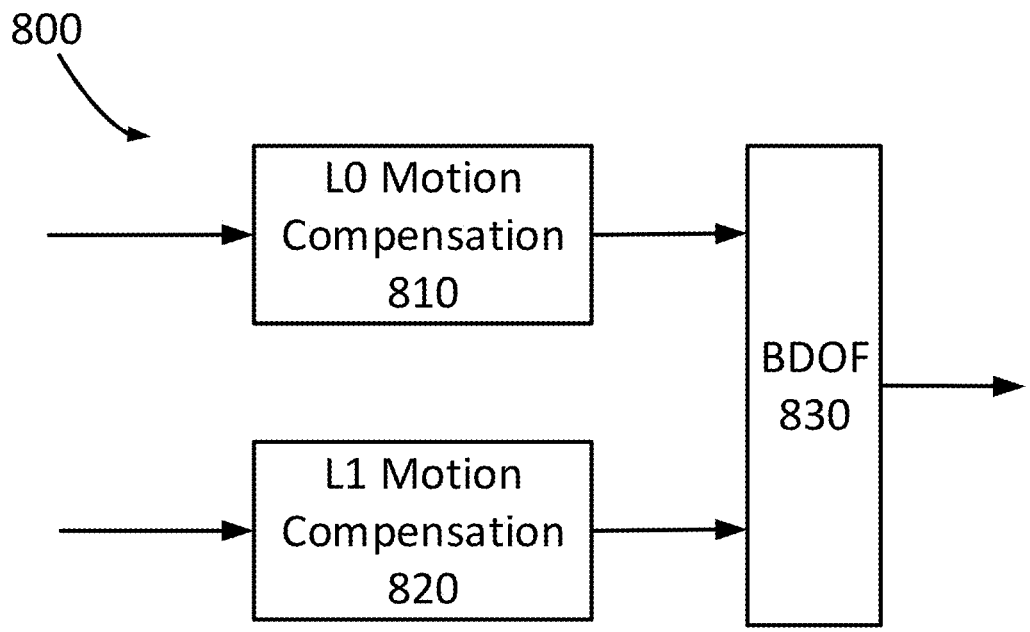
FIG. 8 is a workflow of a BDOF, according to an example of the present disclosure.
Figure 9:
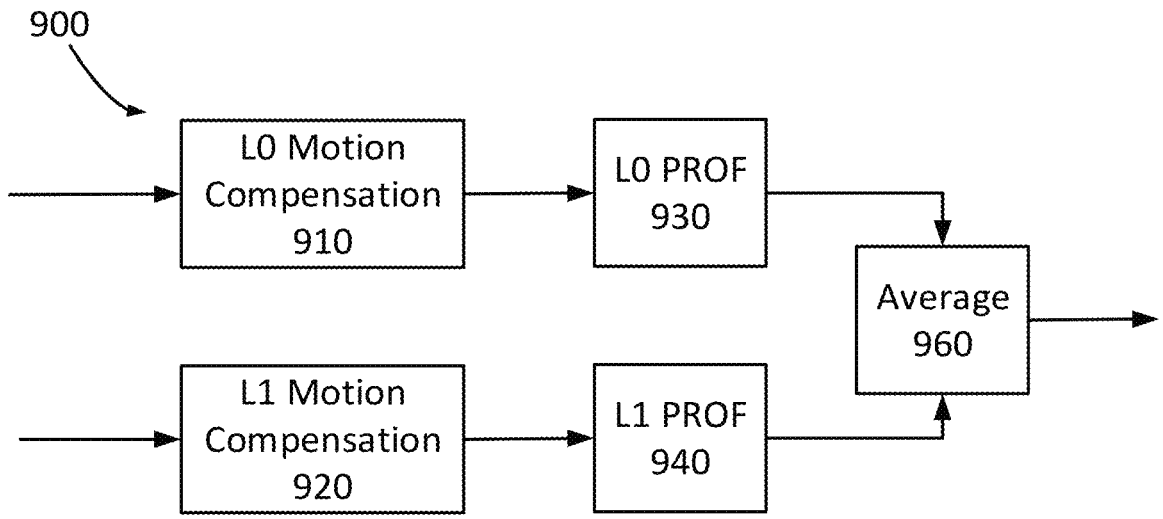
FIG. 9 is a workflow of a PROF, according to an example of the present disclosure.

Second, as discussed in the section "prediction refinement with optical flow for affine mode", when one current affine block is bi-predicted, the PROF is applied to the prediction samples in list L0 and L1 separately; then, the enhanced L0 and L1 prediction signals are averaged to generate the final bi-prediction signal. On the contrary, instead of separately deriving the PROF refinement for each prediction direction, the BDOF derives the prediction refinement once which is then applied to enhance the combined L0 and L1 prediction signal. FIGS. 8 and 9 (described below) compare the workflow of the current BDOF and the PROF for bi-prediction. In practical codec hardware pipeline design, it usually assigns different major encoding/decoding modules to each pipeline stage such that more coding blocks can be processed in parallel. However, due to the difference between the BDOF and PROF workflows, this may lead to difficulty to have one same pipeline design that can be shared by the BDOF and the PROF, which is unfriendly for practical codec implementation.

FIG. 8 shows the workflow of a BDOF, in accordance with the present disclosure. Workflow 800 includes L0 motion compensation 810, L1 motion compensation 820, and BDOF 830. L0 motion compensation 810, for example, can be a list of motion compensation samples from a previous reference picture. The previous reference picture is a reference picture previous from the current picture in the video block. L1 motion compensation 820, for example, can be a list of motion compensation samples from the next reference picture. The next reference picture is a reference picture after the current picture in the video block. BDOF 830 intakes motion compensation samples from L1 Motion Compensation 810 and L1 Motion Compensation 820 and output prediction samples, as described with regards to FIG. 4 above.

FIG. 9 shows a workflow of an existing PROF, in accordance with the present disclosure. Workflow 900 includes L0 motion compensation 910, L1 motion compensation 920, L0 PROF 930, L1 PROF 940, and average 960. L0 motion compensation 910, for example, can be a list of motion compensation samples from a previous reference picture. The previous reference picture is a reference picture previous from the current picture in the video block. L1 motion compensation 920, for example, can be a list of motion compensation samples from the next reference picture. The next reference picture is a reference picture after the current picture in the video block. L0 PROF 930 intakes the L0 motion compensation samples from L0 Motion Compensation 910 and outputs motion refinement values, as described with regards to FIG. 7 above. L1 PROF 940 intakes the L1 motion compensation samples from L1 Motion Compensation 920 and outputs motion refinement values, as described with regards to FIG. 7 above. Average 960 averages the motion refinement value outputs of L0 PROF 930 and L1 PROF 940.

Third, for both the BDOF and the PROF, the gradients need to be calculated for each sample inside the current coding block, which requires generating one additional row/column of prediction samples on each side of the block. To avoid the additional computational complexity of sample interpolation, the prediction samples in the extended region around the block are directly copied from the reference samples at integer position (i.e., without interpolation). However, according to the existing design, the integer samples at different locations are selected to generate the gradient values of the BDOF and the PROF. Specifically, for the BDOF, the integer reference sample that is located left to the prediction sample (for horizontal gradients) and above the prediction sample (for vertical gradients) are used; for the PROF, the integer reference sample that is closest to the prediction sample is used for gradient calculations. Similar to the bit-depth representation problem, such non-unified gradient calculation method is also undesirable for hardware codec implementations.

Fourth, as pointed out earlier, the motivation of the PROF is to compensate the small MV difference between the MV of each sample and the subblock MV that is derived at the center of the subblock that the sample belongs to. According to the current PROF design, the PROF is always invoked when one coding block is predicted by the affine mode. However, as indicated in equation (6) and (7), the subblock MVs of one affine block is derived from the control-point MVs. Therefore, when the difference between the control-point MVs are relatively small, the MVs at each sample position should be consistent. In such case, because the benefit of applying the PROF could be very limited, it may not worth to do the PROF when considering the performance/complexity tradeoff.

Improvements to Prediction Refinement with Optical Flow for Affine Mode

In this disclosure, methods are provided to improve and simplify the existing PROF design to facilitate hardware codec implementations. Particularly, special attention is made to harmonize the designs of the BDOF and the PROF in order to maximally share the existing BDOF logics with the PROF. In general, the main aspects of the proposed technologies in this disclosure are summarized as follows.

First, to improve the coding efficiency of the PROF while achieving one more unified design, one method is proposed to unify the representation bit-depth of the sample gradients and the MV difference that are used by the BDOF and the PROF.

Second, to facilitate hardware pipeline design, it is proposed to harmonize the workflow of the PROF with that of the BDOF for bi-prediction. Specifically, unlike the existing PROF that derives the prediction refinements separately for L0 and L1, the proposed method derives the prediction refinement once which is applied to the combined L0 and L1 prediction signal.

Third, two methods are proposed to harmonize the derivation of the integer reference samples to calculate the gradient values that are used by the BDOF and the PROF.

Fourth, to reduce the computational complexity, early termination methods are proposed to adaptively disable the PROF process for affine coding blocks when certain conditions are satisfied.

Improved Bit-Depth Representation Design of PROF Gradients and MV Difference

As analyzed in Section "problem statement", the representation bit-depths of the MV difference and the sample gradients in the current PROF are not aligned to derive accurate prediction refinements. Moreover, the representation bit-depth of the sample gradients and the MV difference are inconsistent between the BDOF and the PROF, which is unfriendly for hardware. In this section, one improved bit-depth representation method is proposed by extending the bit-depth representation method of the BDOF to the PROF. Specifically, in the proposed method, the horizontal and vertical gradients at each sample position are calculated as $$g_x(i, j) = (I(i + 1, j) - I(i - 1, j)) \gg \max(6, \text{bit-depth} - 6) \quad (13)$$
$$g_y(i, j) = (I(i, j + 1) - I(i, j - 1)) \gg \max(6, \text{bit-depth} - 6)$$

Additionally, assuming $\Delta x$ and $\Delta y$ be the horizontal and vertical offset represented at ¼-pel accuracy from one sample location to the center of the sub-block that the sample belongs to, the corresponding PROF MV difference $\Delta v(x, y)$ at the sample position is derived as $$\Delta v_x(i,j) = (c*\Delta x + d*\Delta y) \gg (13 - \text{dMvBits})$$
$$\Delta v_y(i,j) = (e*\Delta x + f*\Delta y) \gg (13 - \text{dMvBits}) \quad (14)$$

where dMvBits is the bit-depth of the gradient values that are used by the BDOF process, i.e., dMvBits=max(5, (bit-depth−7))+1. In equation (13) and (14), c, d, e and f are affine parameters which are derived based on the affine control-point MVs. Specifically, for 4-parameter affine model, $$\begin{cases} c = f = \dfrac{v_{1x} - v_{0x}}{w} \\ e = -d = \dfrac{v_{1y} - v_{0y}}{w} \end{cases}$$

For 6-parameter affine model, $$\begin{cases} c = \dfrac{v_{1x} - v_{0x}}{w} \\ d = \dfrac{v_{2x} - v_{0x}}{h} \\ e = \dfrac{v_{1y} - v_{0y}}{w} \\ f = \dfrac{v_{2y} - v_{0y}}{h} \end{cases}$$

where $(v_{0x}, v_{0y})$, $(v_{1x}, v_{1y})$, $(v_{2x}, v_{2y})$ are the top-left, top-right and bottom-left control point MVs of the current coding block which are represented in 1/16-pel precision, and w and h are the width and height of the block.

In the above discussion, as shown in equation (13) and (14), a pair of fixed right shifts are applied to calculate the values of the gradients and the MV differences. In practice, different bit-wise right shifts may be applied to (13) and (14) achieve various representation precisions of the gradients and the MV difference for different trade-off between intermediate computational precision and the bit-width of the internal PROF derivation process. For example, when the input video contains a lot of noise, the derived gradients may not be reliable to represent the true local horizontal/vertical gradient values at each sample. In such case, it makes more sense to use more bits to represent the MV differences than the gradients. On the other, when the input video shows steady motion, the MV differences as derived by the affine model should be very small. If so, using high precision MV difference cannot provide additional beneficial to increase the precision of the derived PROF refinement. In other words, in such case, it is more beneficial to use more bits to represent gradient values. Based on the above consideration, in one or more embodiments of the disclosure, one general method in proposed in the following to calculate the gradients and the MV difference for the PROF. Specifically, assuming the horizontal and vertical gradients at each sample position are calculated by applying $n_a$ right shifts to the difference of the neighboring prediction samples, i.e., $$g_x(i,j) = (I(i+1,j) - I(i-1,j)) \gg n_a$$
$$g_y(i,j) = (I(i,j+1) - I(i,j-1)) \gg n_a \quad (15)$$

the corresponding PROF MV difference $\Delta v(x, y)$ at the sample position should be calculated as $$\Delta v_x(i,j) = (c*\Delta x + d*\Delta y) \gg (13 - n_a)$$
$$\Delta v_y(i,j) = (e*\Delta x + f*\Delta y) \gg (13 - n_a) \quad (16)$$

where $\Delta x$ and $\Delta y$ be the horizontal and vertical offset represented at ¼-pel accuracy from one sample location to the center of the sub-block that the sample belongs and c, d, e and f are affine parameters which are derived based on 1/16-pel affine control-point MVs. Finally, the final PROF refinement of the sample is calculated as $$\Delta I(i,j) = (g_x(i,j)*\Delta v_x(i,j) + g_y(i,j)*\Delta v_y(i,j) + 1) \gg 1 \quad (17)$$

In another embodiment, another PROF bit-depth control method is proposed as follows. In the method, the horizontal and vertical gradients at each sample position are still calculated as in (18) by applying $n_a$ bit of right shifts to the difference value of the neighboring prediction samples. The corresponding PROF MV difference $\Delta v(x, y)$ at the sample position should be calculated as:

$$\Delta v_x(i,j) = (c*\Delta x + d*\Delta y) \gg (14 - n_a)$$
$$\Delta v_y(i,j) = (e*\Delta x + f*\Delta y) \gg (14 - n_a)$$

Additionally, in order to keep the whole PROF derivation at appropriate internal bit-depth, clipping is applied to the derived MV difference as follows:

$$\Delta v_x(i,j) = \text{Clip3}(-\text{limit}, \text{limit}, \Delta v_x(i,j))$$
$$\Delta v_y(i,j) = \text{Clip3}(-\text{limit}, \text{limit}, \Delta v_y(i,j))$$

where limit is the threshold which is equal to $2^{n_b}$ and clip3(min, max, x) is a function that clips a given value x inside the range of [min, max]. In one example, the value of $n_b$ is set to be $2^{\max(5, \text{bitdepth}-7)}$. Finally, the PROF refinement of the sample is calculated as $$\Delta I(i,j) = g_x(i,j)*\Delta v_x(i,j) + g_y(i,j)*\Delta v_y(i,j)$$

Additionally, in one or more embodiments of the disclosure, one PROF bit-depth control solution is proposed. In this method, the horizontal and vertical PROF motion refinements at each sample position (i, j) are derived as $$\Delta v_x(i, j) = (c*\Delta x + d*\Delta y) \gg (13 - \max(5, \text{bit-depth} - 7))$$
$$\Delta v_y(i, j) = (e*\Delta x + f*\Delta y) \gg (13 - \max(5, \text{bit-depth} - 7))$$

Further, the derived horizontal and vertical motion refinements are clipped as $$\Delta v_x(i, j) =$$
$$Clip3(-\max(5, \text{bit-depth} - 7), \max(5, \text{bit-depth} - 7) - 1, \Delta v_x(i, j))$$
$$\Delta v_y(i, j) =$$
$$Clip3(-\max(5, \text{bit-depth} - 7), \max(5, \text{bit-depth} - 7) - 1, \Delta v_y(i, j))$$

Here, given the motion refinements as derived above, the final PROF sample refinement at location (i, j) is calculated as $$\Delta I(i,j) = x(i,j)^* \Delta v_x(i,j) + g_y(i,j)^* \Delta v_y(i,j)$$

In another embodiment of the disclosure, another PROF bit-depth control solution is proposed. In the second method, the horizontal and vertical PROF motion refinements at sample position (i, j) are derived as $$\Delta v_x(i, j) = (c * \Delta x + d * \Delta y) \gg (13 - \max(6, \text{bit-depth} - 6))$$
$$\Delta v_y(i, j) = (e * \Delta x + f * \Delta y) \gg (13 - \max(6, \text{bit-depth} - 6))$$

Then, the derived motion refinements are clipped as $$\Delta v_x(i, j) =$$
$$Clip3(-\max(5, \text{bit-depth} - 7), \max(5, \text{bit-depth} - 7) - 1, \Delta v_x(i, j))$$
$$\Delta v_y(i, j) =$$
$$Clip3(-\max(5, \text{bit-depth} - 7), \max(5, \text{bit-depth} - 7) - 1, \Delta v_y(i, j))$$

Thus, given the motion refinements as derived above, the final PROF sample refinement at location (i, j) is calculated as $$\Delta I(i,j) = (g_x(i,j)^* \Delta v_x(i,j) + g_y(i,j)^* \Delta v_y(i,j) + 1) \gg 1$$

In one or more embodiments of the disclosure, it is proposed to combined the motion refinement precision control method in the solution and the PROF sample refinement derivation method in the second solution. Specifically, by this method, the horizontal and vertical PROF motion refinements at each sample position (i, j) are derived as $$\Delta v_x(i, j) = (c * \Delta x + d * \Delta y) \gg (13 - \max(5, \text{bit-depth} - 7))$$
$$\Delta v_y(i, j) = (e * \Delta x + f * \Delta y) \gg (13 - \max(5, \text{bit-depth} - 7))$$

Further, the derived horizontal and vertical motion refinements are clipped as $$\Delta v_x(i, j) =$$
$$Clip3(-\max(5, \text{bit-depth} - 7), \max(5, \text{bit-depth} - 7) - 1, \Delta v_x(i, j))$$
$$\Delta v_y(i, j) =$$
$$Clip3(-\max(5, \text{bit-depth} - 7), \max(5, \text{bit-depth} - 7) - 1, \Delta v_y(i, j))$$

Here, given the motion refinements as derived above, the final PROF sample refinement at location (i, j) is calculated as $$\Delta I(i,j) = (g_x(i,j)^* \Delta v_x(i,j) + g_y(i,j)^* \Delta v_y(i,j) + 1) \gg 1$$

In one or more embodiments, the following PROF sample refinement derivation method is proposed:

First, calculate the PROF horizontal and vertical motion refinements to be in the precision of 1/32-pel by applying the following fixed right shifts, as indicated as $$\Delta v_x(i,j) = (c^* \Delta x + d^* \Delta y) \gg 8$$
$$\Delta v_y(i,j) = (e^* \Delta x + f^* \Delta y) \gg 8$$

Second, clip the calculated PROF motion refinement values to one symmetric range [−31, 31].

$$\Delta v_x(i,j) = Clip3(-31, 31, \Delta v_x(i,j))$$
$$\Delta v_y(i,j) = Clip3(-31, 31, \Delta v_y(i,j))$$

Third, the PROF refinement of the sample is calculated as $$\Delta I(i,j) = g_x(i,j)^* \Delta v_x(i,j) + g_y(i,j)^* \Delta v_y(i,j)$$

Figure 10:
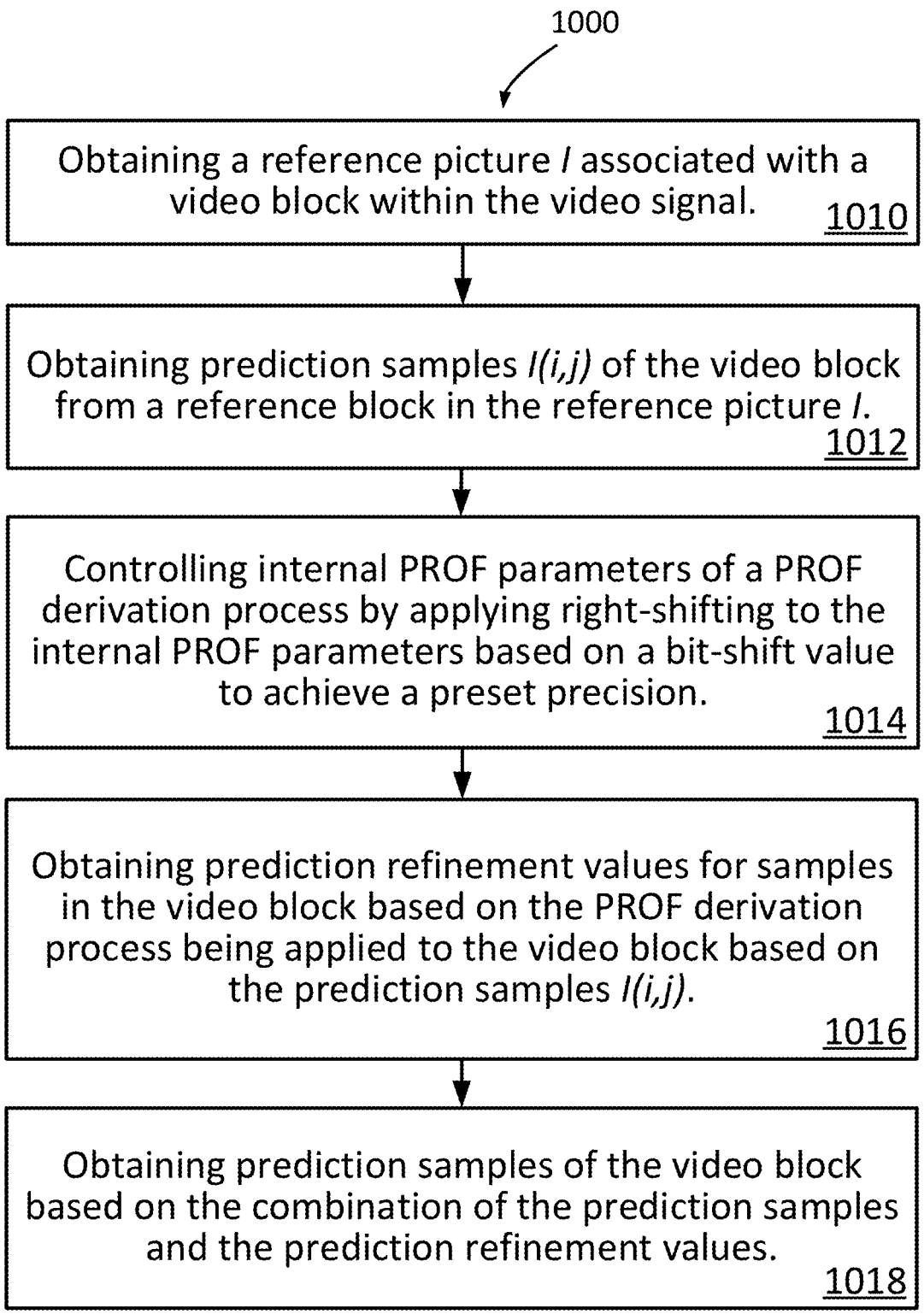
FIG. 10 is a method of BDOF, according to an example of the present disclosure.

FIG. 10 shows a bit-depth representation method of PROF. The method may be, for example, applied to a decoder.

In step 1010, the decoder may obtain a reference picture I associated with a video block within the video signal.

In step 1012, the decoder may obtain prediction samples I(i, j) of the video block from a reference block in the reference picture I. The i and j may represent a coordinate of one sample with the video block.

In step 1014, the decoder may control internal PROF parameters of a PROF derivation process by applying right-shifting to the internal PROF parameters based on a bit-shift value to achieve a preset precision. The internal PROF parameters include horizontal gradient values, vertical gradient values, horizontal motion difference values, and vertical motion difference values derived for the prediction samples I(i, j).

In step 1016, the decoder may obtain prediction refinement values for samples in the video block based on the PROF derivation process being applied to the video block based on the prediction samples I(i,j).

In step 1018, the decoder may obtain prediction samples of the video block based on the combination of the prediction samples and the prediction refinement values.

Additionally, the same parameter derivation method can also be applied to the BDOF sample refinement process as illustrated as $$v_x = sGx2 > 0 ? Clip3(-31, 31, -(sGxdI \ll 2) \gg Floor(Log2(sGx2))) : 0$$

$$v_y = sGy2 > 0 ? Clip3(-31, 31, ((sGydI \ll 2) - ((v_x * sGxGym) \ll 12 + v_x * sGxGys) \gg 1) \gg Floor(Log2(sGy2))) : 0$$

where sGxdI, sGx2, sGxGym, sGxGys and sGy2 are intermediate BDOF derivation parameters.

Figure 11:
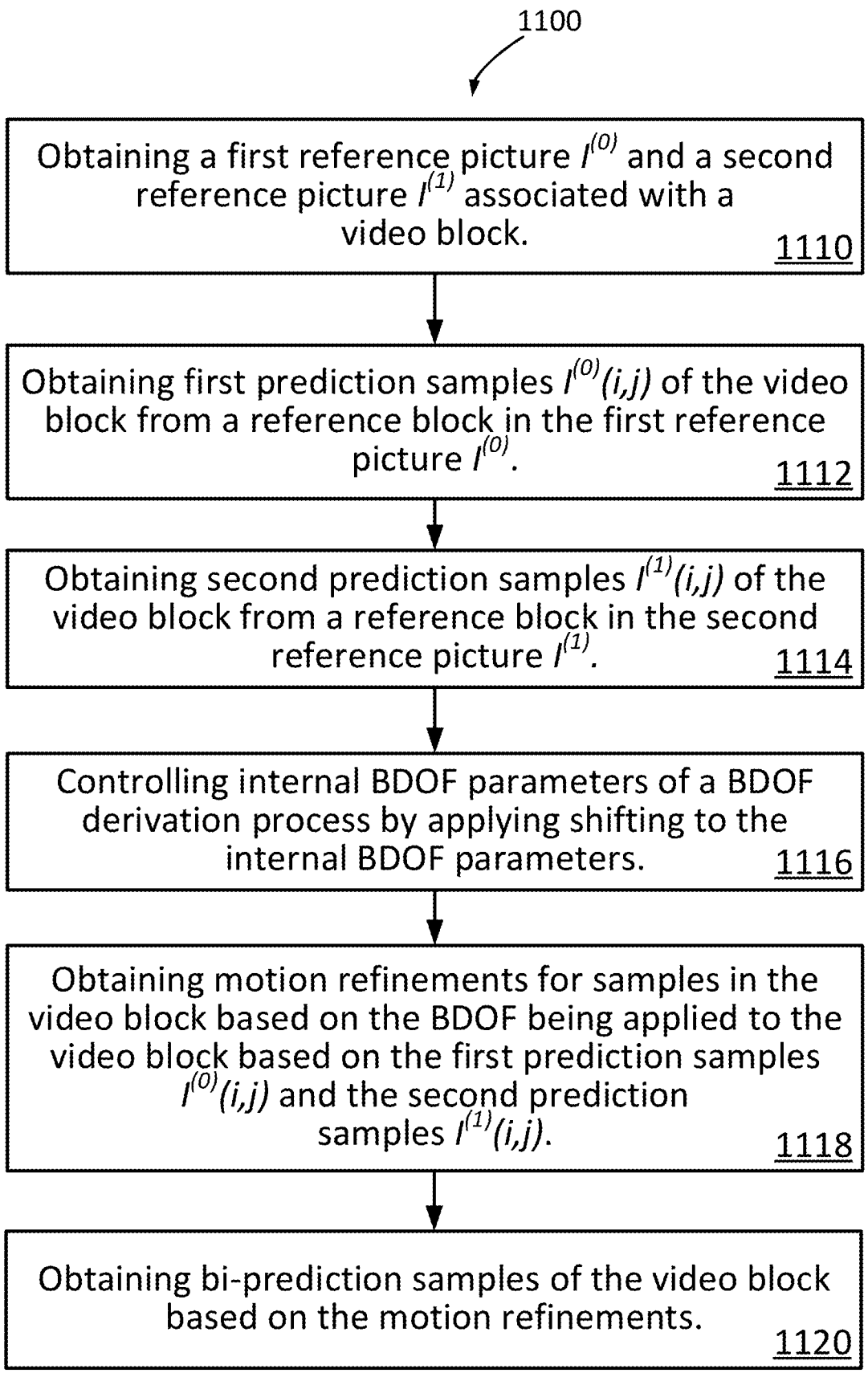
FIG. 11 is a method of BDOF and PROF, according to an example of the present disclosure.

FIG. 11 shows a bit-depth control method of BDOF. The method may be, for example, applied to a decoder.

In step 1110, the decoder may obtain a first reference picture $I^{(0)}$ and a second reference picture $I^{(1)}$ associated with a video block. The first reference picture $I^{(0)}$ is before a current picture and the second reference picture $I^{(1)}$ is after the current picture in display order.

In step 1112, the decoder may obtain first prediction samples $I^{(0)}(i, j)$ of the video block from a reference block in the first reference picture $I^{(0)}$. The i and j may represent a coordinate of one sample with the current picture.

In step 1114, the decoder may obtain second prediction samples $I^{(1)}(i, j)$ of the video block from a reference block in the second reference picture $I^{(1)}$.

In step 1116, the decoder may control internal BDOF parameters of a BDOF derivation process by applying shifting to the internal BDOF parameters. The internal BDOF parameters comprising horizontal gradient values and vertical gradient values derived based on the first prediction samples $I^{(0)}(i, j)$, the second prediction samples $I^{(1)}(i, j)$, sample differences between the first prediction samples $I^{(0)}(i, j)$ and the second prediction samples $I^{(1)}(i, j)$, and intermediate BDOF derivation parameters. The intermediate BDOF derivation parameters include sGxdI, sGydI, sGx2, sGxGy, and sGy2 parameters. The sGxdI and sGydI include cross-correlation values between the horizontal gradient values and sample difference values, and between the vertical gradient values and the sample difference values. The sGx2 and sGy2 include auto-correlation values of the horizontal gradient values and the vertical gradient values. The sGxGy includes the cross-correlation values between the horizontal gradient values and the vertical gradient values.

In step 1118, the decoder may obtain motion refinements for samples in the video block based on the BDOF being applied to the video block based on the first prediction samples $I^{(0)}(i, j)$ and the second prediction samples $I^{(1)}(i, j)$.

In step 1120, the decoder may obtain bi-prediction samples of the video block based on the motion refinements.

Harmonized Workflows of the BDOF and the PROF for Bi-Prediction

As discussed earlier, when one affine coding block is bi-predicted, the current PROF is applied in a unilateral manner. More specifically, the PROF sample refinements are separately derived and applied to the prediction samples in list L0 and L1. After that, the refined prediction signals, respectively from list L0 and L1, are averaged to generate the final bi-prediction signal of the block. This is in contrast to the BDOF design where the sample refinements are derived and applied to the bi-prediction signal. Such difference between the bi-prediction workflows of the BDOF and the PROF may be unfriendly to practical codec pipeline design.

To facilitate hardware pipeline design, one simplification method according to the current disclosure is to modify the bi-prediction process of the PROF such that the workflows of the two prediction refinement methods are harmonized. Specifically, instead of separately applying the refinement for each prediction direction, the proposed PROF method derives the prediction refinements once based on the control-point MVs of list L0 and L1; the derived prediction refinements are then applied to the combined L0 and L1 prediction signal to enhance the quality. Specifically, based on the MV difference as derived in equation (14), the final bi-prediction samples of one affine coding block are calculated by the proposed method as $$pred_{PROF}(i,j)=(I^{(0)}(i,j)+I^{(1)}(i,j)+\Delta I(i,j)+o_{offset})\gg shift$$

$$\Delta I(i,j)=(g_x(i,j)*\Delta v_x(i,j)+g_y(i,j)*\Delta v_y(i,j)+1)\gg 1$$

$$I'(i,j)=I(i,j)+\Delta I(i,j) \quad (18)$$

where shift and $o_{offset}$ are the right shift value and the offset value that are applied to combine the L0 and L1 prediction signals for bi-prediction, which are equal to (15−bitdepth) and 1≪(14−bitdepth)+(2≪13), respectively. Moreover, as shown in (18), the clipping operation in the existing PROF design (as shown in (9)) is removed in the proposed method.

Figure 13:
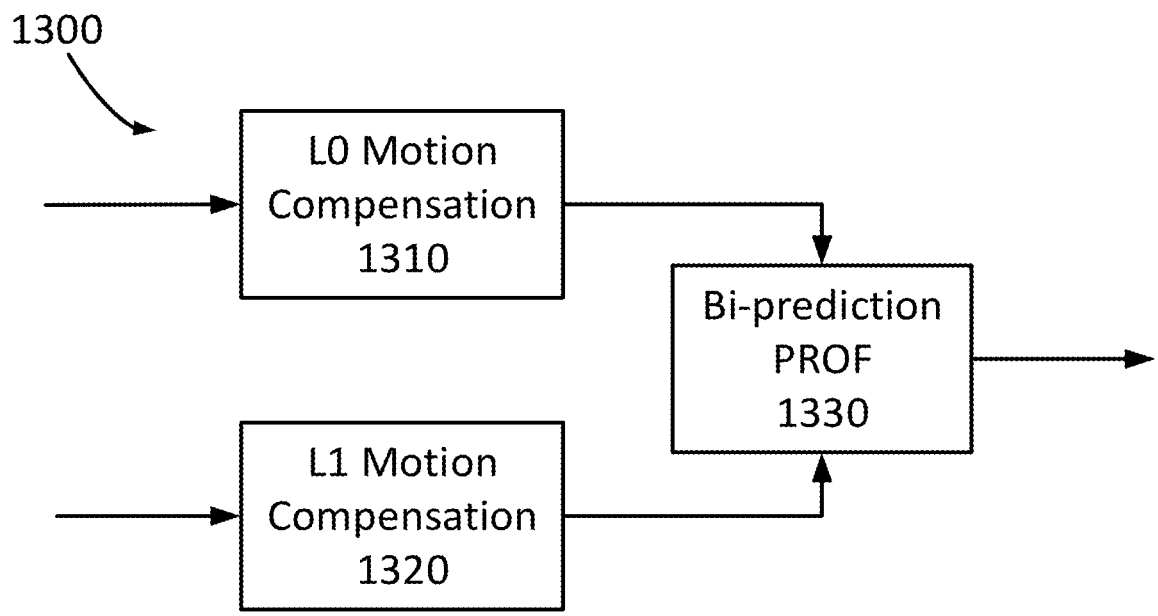
FIG. 13 is an illustration of a workflow of a PROF for bi-prediction, according to an example of the present disclosure.

FIG. 13 illustrates the corresponding PROF process when the proposed bi-prediction PROF method is applied. PROF process 1300 includes L0 motion compensation 1310, L1 motion compensation 1320, and bi-prediction PROF 1330. L0 motion compensation 1310, for example, can be a list of motion compensation samples from a previous reference picture. The previous reference picture is a reference picture previous from the current picture in the video block. L1 motion compensation 1320, for example, can be a list of motion compensation samples from the next reference picture. The next reference picture is a reference picture after the current picture in the video block. Bi-prediction PROF 1330 intakes motion compensation samples from L1 Motion Compensation 1310 and L1 Motion Compensation 1320 and output bi-prediction samples, as described above.

Figure 14:
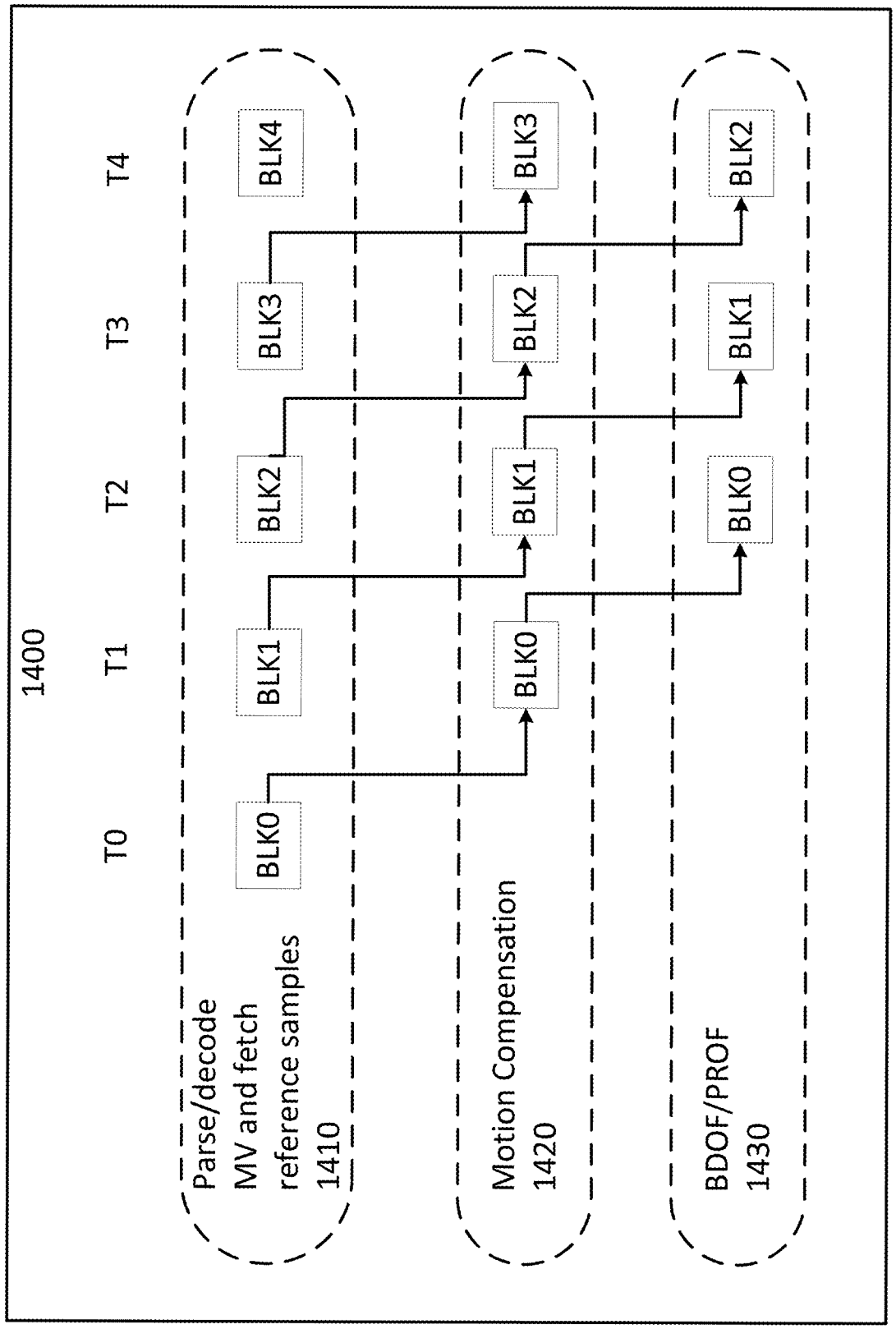
FIG. 14 is an illustration of the pipeline stages of a BDOF and a PROF process, according to the present disclosure.

To demonstrate the potential benefit of the proposed method for hardware pipeline design, FIG. 14 (described below) shows one example to illustrate the pipeline stage when both the BDOF and the proposed PROF are applied. In FIG. 14, the decoding process of one inter block mainly contains three steps:

First, parse/decode the MVs of the coding block and fetch the reference samples.

Second, generate the L0 and/or L1 prediction signals of the coding block.

Third, perform sample-wise refinement of the generated bi-prediction samples based on the BDOF when the coding block is predicted by one non-affine mode or the PROF when the coding block is predicted by affine mode.

FIG. 14 shows an illustration of an example pipeline stage when both the BDOF and the proposed PROF are applied, in accordance with the present disclosure. FIG. 14 demonstrates the potential benefit of the proposed method for hardware pipeline design. Pipeline stage 1400 includes parse/decode MV and fetch reference samples 1410, motion compensation 1420, BDOF/PROF 1430. The Pipeline stage 1400 will encode video blocks BLK0, BKL1, BKL2, BKL3, and BLK4. Each video block will begin in parse/decode MV and fetch reference samples 1410 and move to motion compensation 1420 and then motion compensation 1420, BDOF/PROF 1430, sequentially. This means that BLK0 will not begin in the pipeline stage 1400 process until BLK0 moves onto Motion Compensation 1420. The same for all the stages and video blocks as time goes from T0 to T1, T2, T3, and T4.

As shown in FIG. 14, after the proposed harmonization method is applied, both the BDOF and the PROF are directly applied to the bi-prediction samples. Given that the BDOF and the PROF are applied to different types of coding blocks (i.e., the BDOF is applied to non-affine blocks and the PROF is applied to the affine blocks), the two coding tools cannot be invoked simultaneously. Therefore, their corresponding decoding processes can be conducted by sharing the same pipeline stage. This is more efficient than the existing PROF design where it is hard to assign the same pipeline stage for both the BDOF and the PROF due to their different workflow of bi-prediction.

In the above discussion, the proposed method only considers the harmonization of the workflows of the BDOF and the PROF. However, according to the existing designs, the basic operating unit for the two coding tools are also performed at different sizes. For example, for the BDOF, one coding block is split into multiple subblocks with a size of $W_s \times H_s$, where $W_s=\min(W, 16)$ and $H_s=\min(H, 16)$, where W and H are the width and the height of the coding block. The BDOF operations, such as gradient calculation and sample refinement derivation, are performed independently for each subblock. On the other hand, as described earlier, an affine coding block is divided into 4×4 subblocks, with each subblock assigned one individual MV derived based on either 4-parameter or 6-parameter affine models. Because the PROF is only applied to affine block, its basic operation unit is 4×4 subblock. Similar to the bi-prediction workflow problem, using different basic operating unit size for PROF from BDOF is also unfriendly for hardware implementations and makes it difficult for the BDOF and the PROF to share the same pipeline stage of the whole decoding process. In order to solve such issue, in one or more embodiments, it is proposed to align the subblock size of the affine mode to be the same as that of the BDOF. For example, according to the proposed method, if one coding block is coded by affine mode, it will be split into subblocks with a size of $W_s \times H_s$, where $W_s = \min(W, 16)$ and $H_s = \min(H, 16)$, where W and H are the width and the height of the coding block. Each subblock is assigned one individual MV and considered as one independent PROF operating unit. It's worth mentioning that an independent PROF operating unit ensures that the PROF operation on top of it is performed without referencing the information from neighboring PROF operating units. For example, the PROF MV difference at one sample position is calculated as the difference between the MV at the sample position and the MV at the center of the PROF operating unit in which the sample is located; the gradients used by the PROF derivation are calculated by padding samples along each PROF operating unit. The asserted benefits of the proposed method mainly include the following aspects: 1) simplified pipeline architecture with unified basic operating unit size for both motion compensation and BDOF/PROF refinement; 2) reduced memory bandwidth usage due to the enlarged subblock size for affine motion compensation; 3) reduced per-sample computational complexity of fractional sample interpolation.

It should also be mentioned that because of the reduced computation complexity (i.e., item 3)) with the proposed method, the existing 6-tap interpolation filter constraint for affine coding blocks can be removed. Instead, the default 8-tap interpolation for non-affine coding blocks are also used for affine coding blocks. The overall computational complexity in this case can still compare favorably against the existing PROF design (that is based on 4×4 subblock with 6-tap interpolation filter).

Harmonization of Gradient Derivation for the BDOF and the PROF

As described earlier, both the BDOF and the PROF calculate the gradient of each sample inside the current coding block, which accesses one additional row/column of prediction samples on each side of the block. To avoid the additional interpolation complexity, the needed prediction samples in the extended region around the block boundary are directly copied from the integer reference samples. However, as pointed out in the section "problem statement", the integer samples at different locations are used to calculate the gradient values of the BDOF and the PROF.

To achieve one more uniform design, two methods are proposed in the following to unify the gradient derivation methods used by the BDOF and the PROF. In the first method, it is proposed to align the gradient derivation method of the PROF to be the same as that of the BDOF. For example, by the first method, the integer position used to generate the prediction samples in the extended region is determined by flooring down the fractional sample position, i.e., the selected integer sample position is located left to the fractional sample position (for horizontal gradients) and above the fractional sample position (for vertical gradients).

In the second method, it is proposed to align the gradient derivation method of the BDOF to be the same as that of the PROF. In more details, when the second method is applied, the integer reference sample that is closest to the prediction sample is used for gradient calculations.

Figure 15:
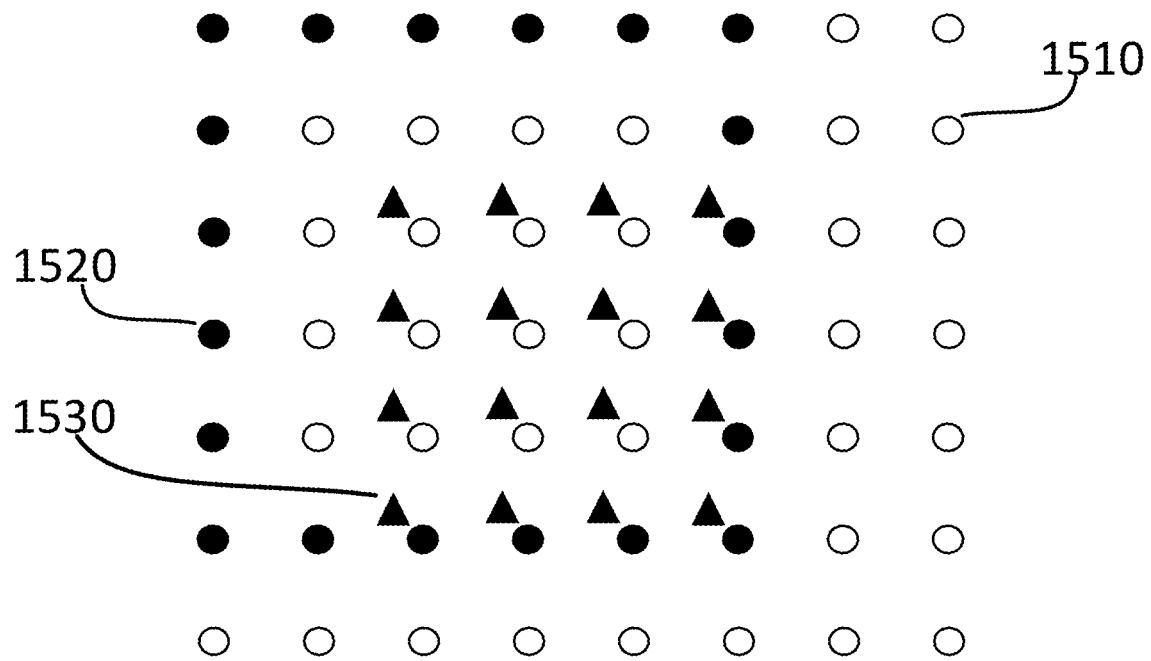
FIG. 15 is an illustration of a gradient derivation method of a BDOF, according to the present disclosure.

FIG. 15 shows an example of using the gradient derivation method of the BDOF, in accordance with the present disclosure. In FIG. 15, the blank circles 1510 represent reference samples at integer positions, triangles 1530 represent the fractional prediction samples of the current block, and black circles 1520 represent the integer reference samples that used to fill the extended region of the current block.

Figure 16:
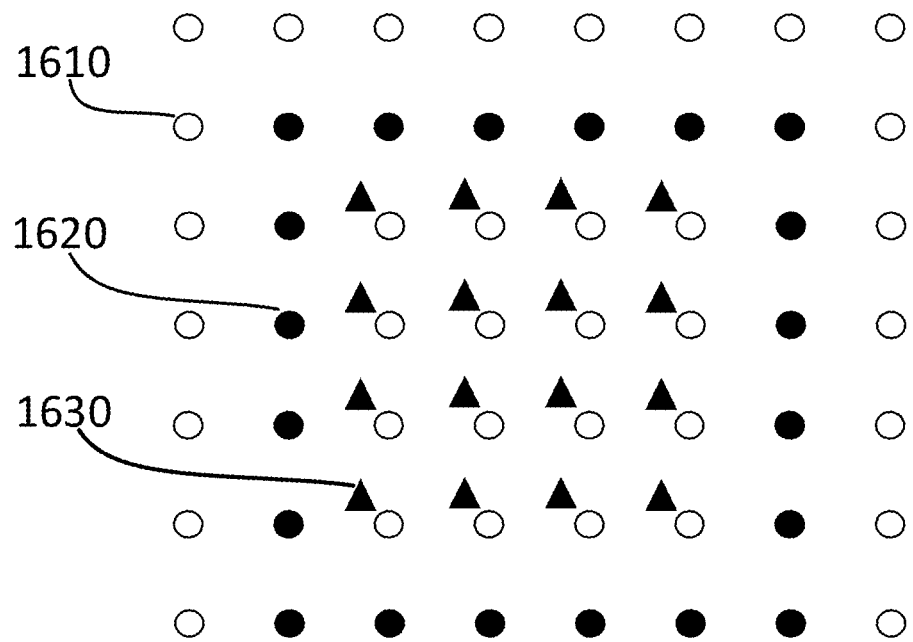
FIG. 16 is an illustration of a gradient derivation method of a PROF, according to the present disclosure.

FIG. 16 shows an example of using the gradient derivation method of the PROF, in accordance with the present disclosure. FIG. 16, the blank circles 1610 represent reference samples at integer positions, triangles 1630 represent the fractional prediction samples of the current block, and black circles 1620 represent the integer reference samples that used to fill the extended region of the current block.

FIG. 15 and FIG. 16 illustrate the corresponding integer sample locations that are used for the derivation of the gradients for the BDOF and the PROF when the first method (FIG. 15) and the second method (FIG. 16) are applied, respectively. In FIG. 15 and FIG. 16, the blank circles represent reference samples at integer positions, triangles represent the fractional prediction samples of the current block and patterned circles represent the integer reference samples that are used to fill the extended region of the current block for gradient derivation.

Additionally, according to the existing BDOF and PROF designs, the prediction sample padding is conducted at different coding levels. For example, for the BDOF, the padding is applied along the boundaries of each sbWidth×sbHeight subblock where sbWidth=min(CUWidth, 16) and sbHeight=min(CUHeight, 16). CUWidth and CUHeight are the width and height of one CU. On the other hand, the padding of the PROF is always applied on 4×4 subblock level. In the above discussion, only the padding method is unified between the BDOF and the PROF while the padding subblock sizes are still different. This is also not friendly for practical hardware implementation given that different modules need to be implemented for the padding processes of the BDOF and the PROF. To achieve one more unified design, it is proposed to unify the subblock padding size of the BDOF and the PROF. In one or more embodiments of the disclosure, it is proposed to apply the prediction sample padding of the BDOF at 4×4 level. For example, by this method, the CU is firstly divided into multiple 4×4 subblocks; after the motion compensation of each 4×4 subblock, the extended samples along top/bottom and left/right boundaries are padded by copying the corresponding integer sample positions. FIGS. 19A, 19B, 19C, and 19D illustrates one example where the proposed padding method is applied to one 16×16 BDOF CU, where dash lines represent 4×4 subblock boundaries and blue bands represent padded samples of each 4×4 subblock.

Figure 19A:
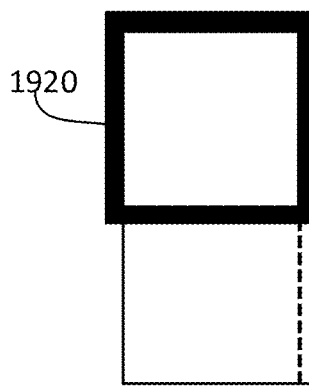
FIG. 19A is a diagram illustrating a proposed padding method applied to a 16×16 BDOF CU, according to an example of the present disclosure.

FIG. 19A shows a proposed padding method applied to a 16×16 BDOF CU, where the dash lines represent a top left 4×4 subblock boundary 1920, according to the present disclosure.

Figure 19B:
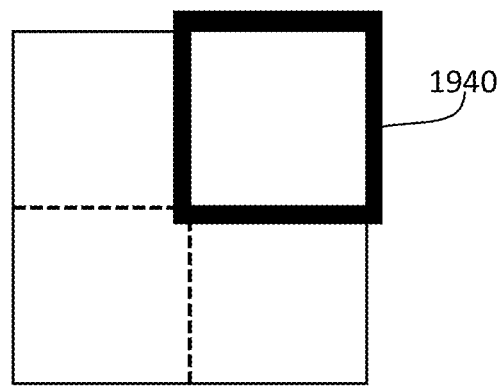
FIG. 19B is a diagram illustrating a proposed padding method applied to a 16×16 BDOF CU, according to an example of the present disclosure.

FIG. 19B shows a proposed padding method applied to a 16×16 BDOF CU, where the dash lines represent a top right 4×4 subblock boundary 1940, according to the present disclosure.

Figure 19C:
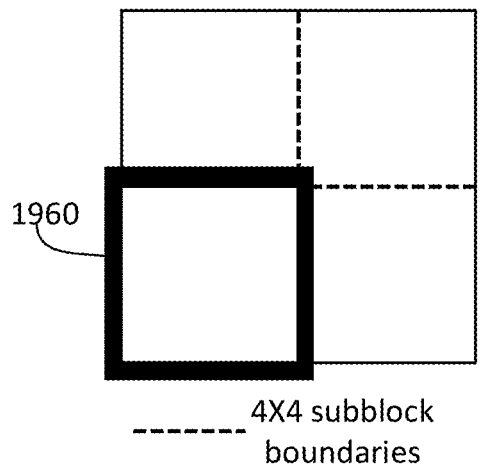
FIG. 19C is a diagram illustrating a proposed padding method applied to a 16×16 BDOF CU, according to an example of the present disclosure.

FIG. 19C shows a proposed padding method applied to a 16×16 BDOF CU, where the dash lines represent a bottom left 4×4 subblock boundary 1960, according to the present disclosure.

Figure 19D:
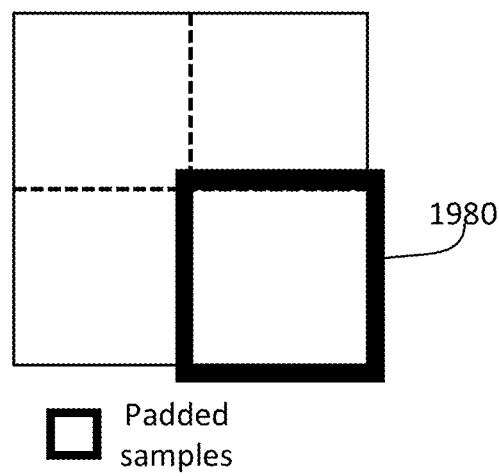
FIG. 19D is a diagram illustrating a proposed padding method applied to a 16×16 BDOF CU, according to an example of the present disclosure.

FIG. 19D shows a proposed padding method applied to a 16×16 BDOF CU, where the dash lines represent a bottom right 4×4 subblock boundary 1980, according to the present disclosure.

High-Level Signaling Syntax to Enable/Disable the BDOF, PROF and DMVR

In the existing BDOF and PROF designs, two different flags are signaled in the sequence parameter set (SPS) to control the enabling/disabling of the two coding tools separately. However, due to the similarity between the BDOF and the PROF, it is more desirable to enable and/or disable the BDOF and the PROF from high level by one same controlling flag. Based on such consideration, one new flag, which is called sps_bdof_prof_enabled_flag, is introduced at the SPS, as shown in Table 1. As shown in Table 1, the enabling and disabling of the BDOF is only dependent on the sps_bdof_prof_enabled_flag. When the flag is equal to 1, the BDOF is enabled for coding the video content in the sequence. Otherwise, when sps_bdof_prof_enabled_flag is equal to 0, the BDOF will not be applied. On the other hand, in addition to the sps_bdof_prof_enabled_flag, the SPS level affine control flag, i.e., sps_affine_enabled_flag, is also used to conditionally enable and disable the PROF. When both the flags sps_bdof_prof_enabled_flag and sps_affine_enabled_flag are equal to 1, the PROF is enabled for all the coding blocks that are coded in affine mode. When the flag sps_bdof_prof_enabled_flag is equal to 1 and sps_affine_enabled_flag is equal to 0, the PROF is disabled.

TABLE 1

Modified SPS syntax table with the proposed BDOF/PROF enabling/disabling flag

| seq_parameter_set_rbsp( ) { | Descriptor |
|---|---|
| ...... | |
| if( sps_temporal_mvp_enabled_flag ) | |
| sps_sbtmvp_enabled_flag | u(1) |
| sps_amvr_enabled_flag | u(1) |
| sps_bdof_prof_enabled_flag | u(1) |
| sps_smvd_enabled_flag | u(1) |
| sps_affine_amvr_enabled_flag | u(1) |
| sps_dmvr_enabled_flag | u(1) |
| if(sps_bdof_prof_enabled_flag \|\| sps_dmvr_enabled_flag) | |
| sps_bdof_prof_dmvr_slice_present_flag | u(1) |
| sps_mmvd_enabled_flag | u(1) |
| sps_isp_enabled_flag | u(1) |
| sps_mrl_enabled_flag | u(1) |
| sps_mip_enabled_flag | u(1) |
| sps_cclm_enabled_flag | u(1) |
| ...... | |
| } | | sps_bdof_prof_enabled_flag specifies whether the bidirectional optical flow and prediction refinement with optical flow is enabled or not. When sps_bdof_prof_enabled_flag is equal to 0, both the bidirectional optical flow and prediction refinement with optical flow are disabled. When sps_bdof_prof_enabled_flag is equal to 1 and sps_affine_enabled_flag is equal to 1, both bidirectional optical flow and prediction refinement with optical flow are enabled. Otherwise (sps_bdof_prof_enabled_flag is equal to 1 and sps_affine_enabled_flag is equal to 0) bidirectional optical flow is enabled and prediction refinement with optical flow is disabled.

sps_bdof_prof_dmvr_slice_preset_flag specifies when the flag slice_disable_bdof_prof_dmvr_flag is signaled at slice leve. When the flag is equal to 1, the syntax slice_disable_bdof_prof_dmvr_flag is signaled for each slice that refers to the current sequence parameter set. Otherwise (when sps_bdof_prof_dmvr_slice_present_flag is equal to 0), the syntax slice_disabled_bdof_prof_dmvr_flag will not be signaled at slice level. When the flag is not signaled, it is inferred to be 0.

Further, when the proposed SPS level BDOF and PROF control flag is used, the corresponding control flag no_bdof_constraint_flag in general constraint information syntax should also be modifed by

| general_constraint_info( ) { | Descriptor |
|---|---|
| ... | |
| no_temporal_mvp_constraint_flag | u(1) |
| no_sbtmvp_constraint_flag | u(1) |
| no_amvr_constraint_flag | u(1) |
| no_bdof_prof_constraint_flag | u(1) |
| ... | |
| while( !byte_aligned( ) ) | |
| gci_alignment_zero_bit | f(1) |
| } | | no_bdof_prof_constraint_flag equal to 1 specifies that sps_bdof_prof_enabled_flag shall be equal to 0. no_bdof_constraint_flag equal to 0 does not impose a constraint.

In addition to the above SPS BDOF/PROF syntax, it is proposed to introduce another control flag at slice leve, i.e., slice_disable_bdof_prof_dmvr_flag is introduced for disabling BDOF, PROF and DMVR. A SPS flag sps_bdof_prof_dmvr_slice_present_flag, which is signalled in the SPS when either of DMVR or BDOF/PROF sps level control flags are true, is used to indicate the presence of slice_disable_bdof_prof_dmvr_flag. If present, the slice_disable_bdof_dmvr_flag is signaled. Table 2 illustrates the modified slice header syntax table after the proposed syntax are applied. In another embodiment, it is proposed to still use two control flags at slice header to separately control the enabling/disabling of the BDOF and DMVR, and the enabling/disabling of the PROF. For example, two flags are used in the slice header by this method: one flag is slice_disable_bdof_dmvr_slice_flag is used to control on/off of the BDOF and the DMVR and the other flag disable_prof_slice_flag is used to control on/off of the PROF alone.

TABLE 2

Modified SPS syntax table with the proposed BDOF/PROF enabling/disabling flag

| seq_parameter_set_rbsp( ) { | |
|---|---|
| if( sps_bdof_prof_dmvr_slice_present_flag ) | |
| slice_disable_bdof_prof_dmvr_enabled_flag | u(1) |
| ...... | |

In another embodiment, it is proposed to separately control the BDOF and PROF by two different SPS flags. For example, two separate SPS flags sps_bdof_enable_flag and sps_prof_enable flag are introduced to enable/disable the two tools separately. Additionally, one high-level control flag no_prof_constraint_flag needs to be added in general_constrain_info( ) syntax table to forcibly disable the PROF tool

| seq_parameter_set_rbsp( ) { | Descriptor |
|---|---|
| ...... | |
| if( sps_temporal_mvp_enabled_flag ) | |
|   sps_sbtmvp_enabled_flag | u(1) |
| sps_amvr_enabled_flag | u(1) |
| sps_bdof_enabled_flag | u(1) |
| sps_prof_enabled_flag | u(1) |
| sps_smvd_enabled_flag | u(1) |
| sps_affine_amvr_enabled_flag | u(1) |
| sps_dmvr_enabled_flag | u(1) |
| if(sps_bdof_enabled_flag \|\| sps_dmvr_enabled_flag) | |
|   sps_bdof_dmvr_slice_present_flag | u(1) |
| sps_mmvd_enabled_flag | u(1) |
| sps_isp_enabled_flag | u(1) |
| sps_mrl_enabled_flag | u(1) |
| sps_mip_enabled_flag | u(1) |
| sps_cclm_enabled_flag | u(1) |
| ...... | |
| } | | sps_bdof_enabled_flag specifies whether the bidirectional optical flow is enabled or not. When sps_bdof_enabled_flag is equal to 0, the bidirectional optical flow is disabled. When sps_bdof_enabled_flag is equal to 1, the bidirectional optical flow is enabled.

sps_prof_enabled_flag specifies whether the prediction refinement with optical flow is enabled or not. When sps_prof_enabled_flag is equal to 0, the prediction refinement with optical flow is disabled. When sps_prof_enabled_flag is equal to 1, the prediction refinement with optical flow is enabled.

| general_constraint_info( ) { | Descriptor |
|---|---|
| ... | |
| no_temporal_mvp_constraint_flag | u(1) |
| no_sbtmvp_constraint_flag | u(1) |
| no_amvr_constraint_flag | u(1) |
| no_bdof_constraint_flag | u(1) |
| no_prof_constraint_flag | u(1) |
| ... | |
| while( !byte_aligned( ) ) | |
|   gci_alignment_zero_bit | f(1) |
| } | | no_prof_constraint_flag equal to 1 specifies that sps_prof_enabled_flag shall be equal to 0. no_prof_constraint_flag equal to 0 does not impose a constraint.

At slice level, in one or more embodiments of the disclosure, it is proposed to introduce another control flag at slice leve, i.e., slice_disable_bdof_prof_dmvr_flag is introduced for disabling BDOF, PROF and DMVR together. In another embodiment, it is propsoed to add two separate flags, namely, slice_disable_bdof_dmvr_flag and slice_disable_prof_flag, at slice level. The first flag (i.e., slice_disable_bdof_dmvr_flag) is used to adaptively switch on/off the BDOF and DMVR for one slice while the second flag (i.e., slice_disable_prof_flag) is used to control the enabling and disabling of the PROF tool at slice-level. Additionally, when the second method is applied, the flag slice_disable_bdof_dmvr_flag only needs to be signaled when either SPS BDOF or the SPS DMVR flag is enabled and the flag only needs to be signaled when the SPS PROF flag is enabled.

At 16$^{th}$ JVET meeting, picture header was adopted into the VVC draft. The picture header is signaled once per slice which the syntax elements that are previously in the slice header and do not change from slice to slice.

Based on the adopted picture header, in one or more embodiments of the disclosure, it is proposed to control the BDOF, DMVR and PROF control flags from the current slice header to picture header. For example, in the proposed method, three different control flags sps_dmvr_picture_header_present_flag, sps_bdof_picture_header_present_flag and sps_prof_picture_header_present_flag are signaled in the SPS. When one of three flags is signaled as true, one additional control flag will be signaled in the picture header to indicate the corresponding tool (i.e., DMVR, BDOF and PROF) being enabled or disabled for the slices referring to the picture header. The proposed syntax elements are specified as follows.

| seq_parameter_set_rbsp( ) { | Descriptor |
|---|---|
| ...... | |
| if( sps_temporal_mvp_enabled_flag ) | |
|   sps_sbtmvp_enabled_flag | u(1) |
| sps_amvr_enabled_flag | u(1) |
| sps_bdof_enabled_flag | u(1) |
| sps_prof_enabled_flag | u(1) |
| sps_smvd_enabled_flag | u(1) |
| sps_affine_amvr_enabled_flag | u(1) |
| sps_dmvr_enabled_flag | u(1) |
| if(sps_dmvr_enabled_flag) | |
|   sps_dmvr_picture_header_present_flag | u(1) |
| if(sps_bdof_enabled_flag) | |
|   sps_bdof_picture_header_present_flag | u(1) |
| sps_mmvd_enabled_flag | u(1) |
| sps_isp_enabled_flag | u(1) |
| sps_mrl_enabled_flag | u(1) |
| sps_mip_enabled_flag | u(1) |
| sps_cclm_enabled_flag | u(1) |
| ...... | |
| sps_affine_enabled_flag | u(1) |
| if( sps_affine_enabled_flag ) { | |
|   sps_affine_type_flag | u(1) |
|   sps_affine_amvr_enabled_flag | u(1) |
|   sps_affine_prof_enabled_flag | u(1) |
|   if( sps_affine_prof_enabled_flag ) | |
|     sps_prof_picture_header_present_flag | u(1) |
| } | |
| } | | sps_dmvr_picture_header_preset_flag specifies whether the flag picture_disable_dmvr_flag is signaled at picture header. When the flag is equal to 1, the syntax picture_disable_dmvr_flag is signaled for each picture that refers to the current sequence parameter set. Otherwise, the syntax picture_disable_dmvr_flag will not be signaled at picture header. When the flag is not signaled, it is inferred to be 0.

sps_bdof_picture_header_preset_flag specifies whether the flag picture_disable_bdof_flag is signaled at picture header. When the flag is equal to 1, the syntax picture_disable_bdof_flag is signaled for each picture that refers to the current sequence parameter set. Otherwise, the syntax picture_disable_bdof_flag will not be signaled at picture header. When the flag is not signaled, it is inferred to be 0.

sps_prof_picture_header_preset_flag specifies whether the flag picture_disable_prof_flag is signaled at picture header. When the flag is equal to 1, the syntax picture_disable_rpof_flag is signaled for each picture that refers to the current sequence parameter set. Otherwise, the syntax picture_disable_prof_flag will not be signaled at picture header. When the flag is not signaled, it is inferred to be 0.

| picture_header_rbps( ) { | Descriptor |
|---|---|
| if( sps_dmvr_picture_header_present_flag ) | |
|    picture_disable_dmvr_flag | u(1) |
| if( sps_bdof_picture_header_present_flag ) | |
|    picture_disable_bdof_flag | u(1) |
| if( sps_prof_picture_header_present_flag ) | |
|    picture_disable_prof_flag | u(1) |
| } | | picture_disable_dmvr_flag specifies whether the dmvr tool is enabled for the slices that refer to the current picture header. When the flag is equal to 1, the dmvr tool is enabled for the slices referring to the current picture header. Otherwise, the dmvr tool is disabled for the slices referring to the current picture header. When the flag is not present, the flag is inferred to be 0.

picture_disable_bdof_flag specifies whether the bdof tool is enabled for the slices that refer to the current picture header. When the flag is equal to 1, the bdof tool is enabled for the slices referring to the current picture header. Otherwise, the bdof tool is disabled for the slices referring to the current picture header.

picture_disable_prof_flag specifies whether the prof tool is enabled for the slices that refer to the current picture header. When the flag is equal to 1, the prof tool is enabled for the slices referring to the current picture header. Otherwise, the prof tool is disabled for the slices referring to the current picture header.

Figure 12:
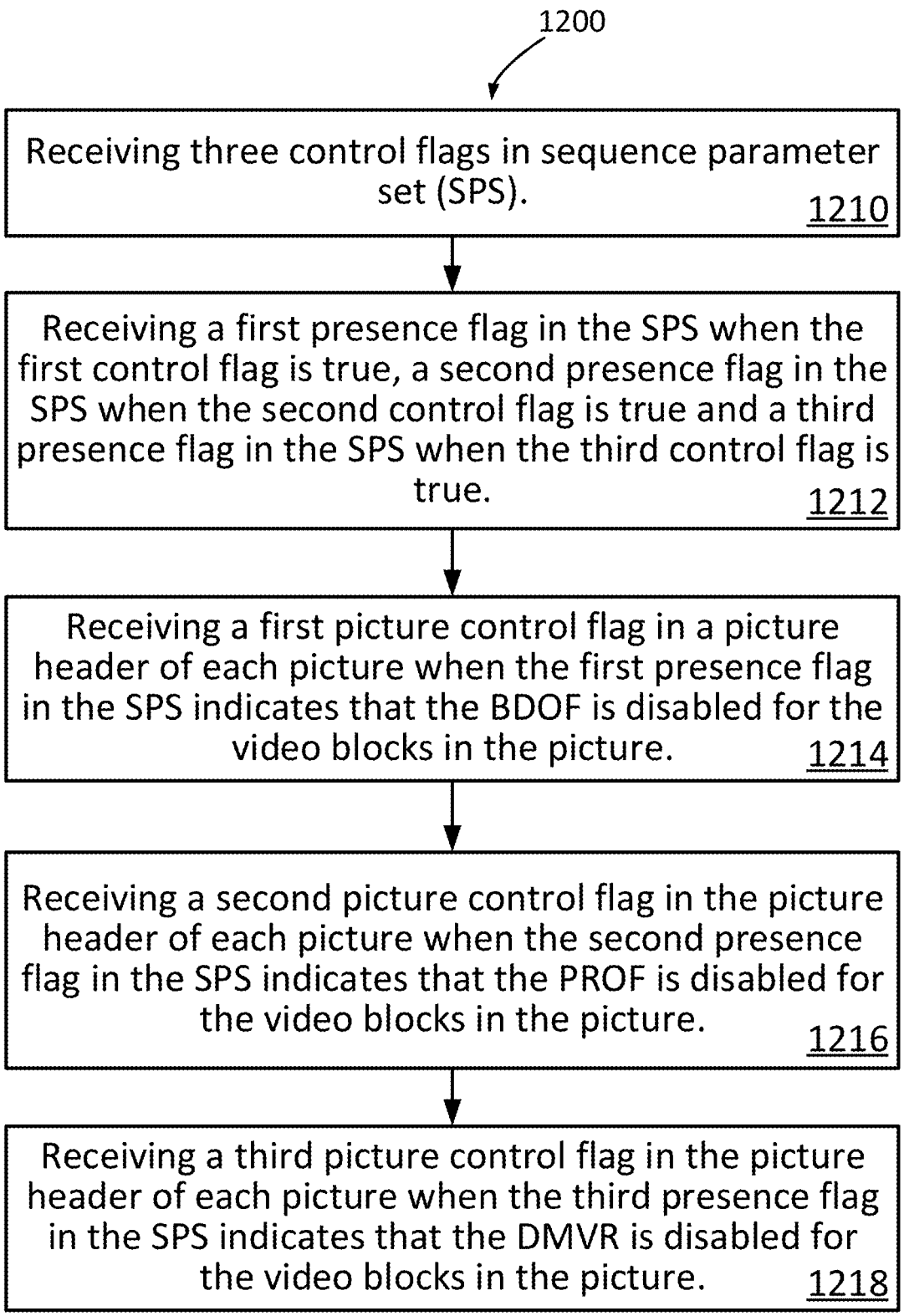
FIG. 12 is a method of BDOF, PROF, and DMVR, according to an example of the present disclosure.

FIG. 12 shows a method of BDOF, PROF, and DMVR. The method may be, for example, applied to a decoder.

In step 1210, the decoder may receive three control flags in sequence parameter set (SPS). A first control flag indicates whether the BDOF is enabled for decoding video blocks in a current video sequence. A second control flag indicates whether the PROF is enabled for decoding the video blocks in the current video sequence. A third control flag indicates whether the DMVR is enabled for decoding the video blocks in the current video sequence.

In step 1212, the decoder may receive a first presence flag in the SPS when the first control flag is true, a second presence flag in the SPS when the second control flag is true and a third presence flag in the SPS when the third control flag is true.

In step 1214, the decoder may receive a first picture control flag in a picture header of each picture when the first presence flag in the SPS indicates that the BDOF is disabled for the video blocks in the picture.

In step 1216, the decoder may receive a second picture control flag in the picture header of each picture when the second presence flag in the SPS indicates that the PROF is disabled for the video blocks in the picture.

In step 1218, the decoder may receive a third picture control flag in the picture header of each picture when the third presence flag in the SPS indicates that the DMVR is disabled for the video blocks in the picture.

Early Termination of the PROF Based on Control-Point MV Difference

According to the current PROF design, the PROF is always invoked when one coding block is predicted by the affine mode. However, as indicated in equation (6) and (7), the subblock MVs of one affine block is derived from the control-point MVs. Therefore, when the difference between the control-point MVs are relatively small, the MVs at each sample position should be consistent. In such case, the benefit of applying the PROF could be very limited. Therefore, to further reduce the average computational complexity of the PROF, it is proposed to adaptively skip the PROF based sample refinement based on the maximum MV difference between the sample-wise MV and the subblock-wise MV within one 4×4 subblock. Because the values of the PROF MV difference of the samples inside one 4×4 subblock are symmetric about the subblock center, the maximum horizontal and vertical PROF MV difference can be calculated based on the equation (10) as $$\Delta v_x^{max} = 6*(c+d)$$

$$\Delta v_y^{max} = 6*(e+f) \tag{19}$$

According to the current disclosure, different metrics may be used in determining if the MV difference is small enough to skip the PROF process.

In one example, based on the equation (19), the PROF process can be skipped when the sum of the absolute maximal horizontal MV difference and the absolute maximal vertical MV difference is smaller than one predefined threshold, i.e., $$|\Delta v_x^{max}| + |\Delta v_y^{max}| \leq thres \tag{20}$$

In another example, if the maximum value of $|\Delta v_x^{max}|$ and $|\Delta v_y^{max}|$ is not larger than a threshold, the PROF process can be skipped.

$$MAX(|\Delta v_x^{max}|, |\Delta v_y^{max}|) \leq thres \tag{21}$$

Where MAX(a, b) is a function that returns the larger value between input values a and b.

In additional to the two examples above, the spirit of the current disclosure is also applicable to the cases when other metrics are used in determining if the MV difference is small enough for skipping the PROF process.

In the above method, the PROF is skipped based on the magnitude of the MV difference. On the other hand, in addition to the MV difference, the PROF sample refinement is also calculated based on the local gradient information at each sample location in one motion compensated block. For prediction blocks that contain less high-frequency details (e.g., the flat area), the gradient values tend to be small such that the values of the derived sample refinements should be small. Taking this into consideration, according to another embodiment, it is proposed to only apply the PROF to the predication samples of the blocks which contain enough high-frequency information.

Different metrics may be used in determining if a block contains enough high-frequency information so that the PROF process is worth to be invoked for the block. In one example, the decision is made based on the average magnitude (i.e. absolute value) of the gradients of the samples within the prediction block. If the average magnitude is smaller than one threshold, then the prediction block is classified as flat area and the PROF should not be applied; otherwise, the prediction block is considered to contain sufficient high-frequency details where the PROF is still applicable. In another example, the maximum magnitude of the gradients of the samples within the prediction block may be used. If the maximum magnitude is smaller than one threshold, PROF is to be skipped for the block. In yet another example, the difference between the maximum sample value and the minimum sample value, $I_{max} - I_{min}$, of a prediction block may be used to determine if PROF is to be applied to the block. If such a difference value is smaller than a threshold, PROF is to be skipped for the block. It is worth noting that the spirit of the disclosure is also applicable to the cases where some other metrics are used in determining if a given block contains enough high-frequency information or not.

Handle the Interaction Between the PROF and the LIC for Affine Mode

Because the neighboring reconstructed samples (i.e., template) of a current block are used by the LIC to derive the linear model parameters, the decoding of one LIC coding block is dependent on the full reconstruction of its neighboring samples. Due to such interdependency, for practical hardware implementations, LIC needs to be performed in the reconstruction stage where neighboring reconstructed samples become available for LIC parameter derivation. Because block reconstruction must be performed sequentially (i.e., one by one), throughput (i.e., the amount of work that can be done in parallel per unit time) is one important issue to consider when jointly applying other coding methods to the LIC coding blocks. In this section, two methods are proposed to handle the interaction when both the PROF and the LIC are enabled for affine mode.

In the first embodiment of this disclosure, it is proposed to exclusively apply the PROF mode and the LIC mode for one affine coding block. As discussed earlier, in the existing design, the PROF is implicitly applied for all affine blocks without signaling while one LIC flag is signaled or inherited at coding block level to indicate whether the LIC mode is applied to one affine block or not. According to the method in the disclosure, it is proposed to conditionally apply the PROF based on the value of the LIC flag of one affine block. When the flag is equal to one, only the LIC is applied by adjusting the prediction samples of the whole coding block based on the LIC weight and offset. Otherwise (i.e., the LIC flag is equal to zero), the PROF is applied to the affine coding block to refine the prediction samples of each sub-block based on optical flow model.

Figure 18A:
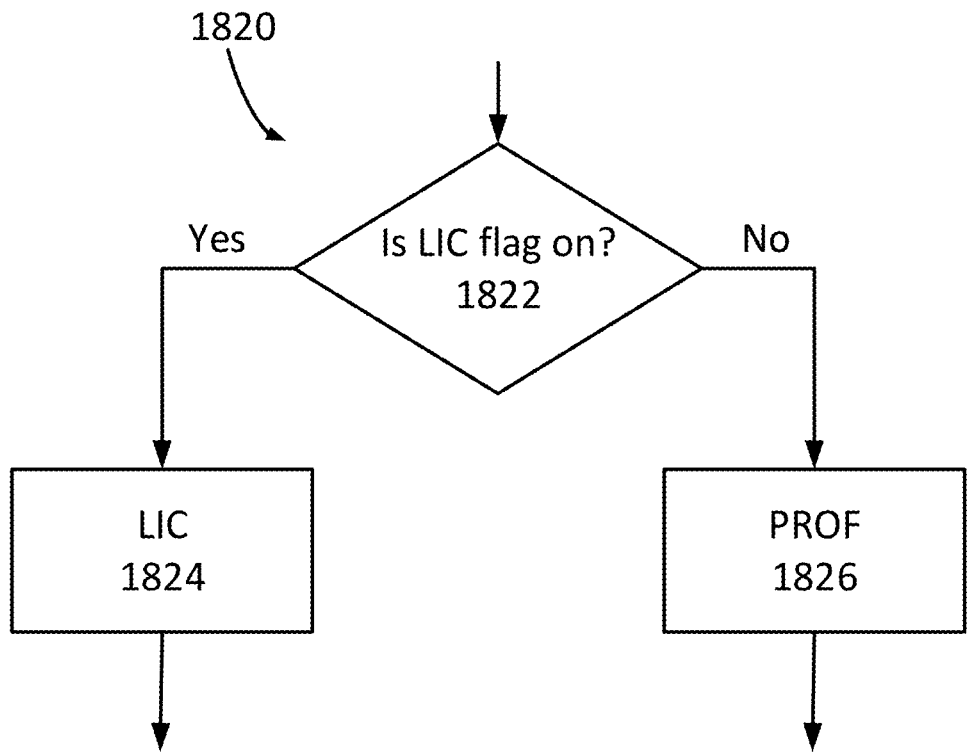
FIG. 18A is an illustration of exclusively enabling the PROF and the LIC for affine mode, according to an example of the present disclosure.

FIG. 18A illustrates one exemplar flowchart of the decoding process based on the proposed method where the PROF and the LIC are disallowed to be applied simultaneously.

FIG. 18A shows an illustration of a decoding process based on the proposed method where the PROF and the LIC are disallowed, in accordance with the present disclosure. The decoding process 1820 includes determining step 1822, LIC 1824, and PROF 1826. Determining step 1822 determines whether an LIC flag is on and the next step is taken according to that determination. LIC 1824 is the application of LIC is the LIC flag is set. PROF 1826 is the application of PROF if the LIC flag is not set.

In the second embodiment of this disclosure, it is proposed to apply the LIC after the PROF to generate the prediction samples of one affine block. For example, after the sub-block-based affine motion compensation is done, the prediction samples are refined based on the PROF sample refinement: then, the LIC is conducted by applying a pair of weight and offset (as derived from the template and its reference samples) to the PROF-adjusted prediction samples to obtain the final prediction samples of the block, as illustrated as $$P[x]=\alpha*(P_r[x+v]+\Delta I[x])+\beta \qquad (22)$$

where $P_r[x+v]$ is the reference block of the current block indicated by the motion vector v; $\alpha$ and $\beta$ are the LIC weight and offset; P|x| is the final prediction block; $\Delta I[x]$ is the PROF refinement as derived in (17).

Figure 18B:
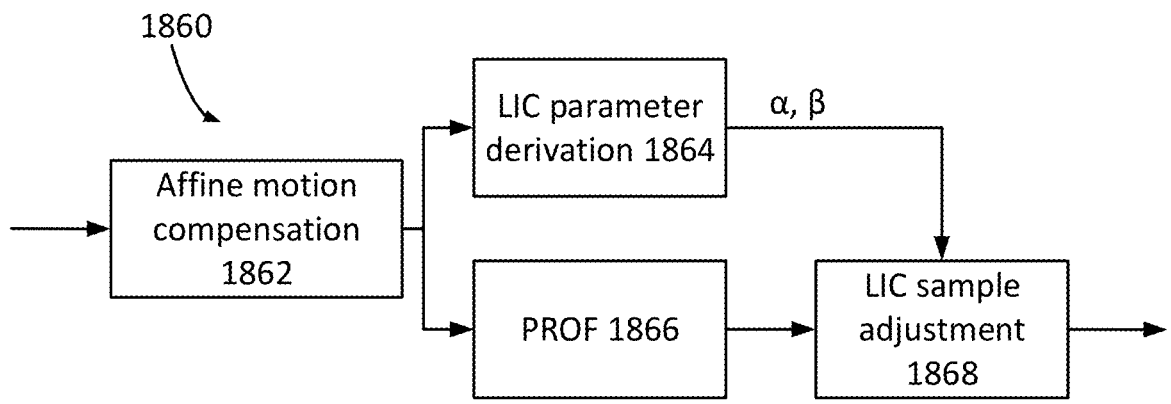
FIG. 18B is an illustration of jointly enabling the PROF and the LIC for affine mode, according to an example of the present disclosure.

FIG. 18B shows an illustration of a decoding process where the PROF and the LIC are applied, in accordance with the present disclosure. The decoding process 1860 includes Affine motion compensation 1862, LIC parameter derivation 1864, PROF 1866, and LIC sample adjustment 1868. The Affine motion compensation 1862 applies affine motion and is an input to LIC parameter derivation 1864 and PROF 1866. LIC parameter derivation 1864 is applied to derive LIC parameters. PROF 1866 is PROF being applied. LIC sample adjustment 1868 is LIC weight and offset parameters being combined with PROF.

FIG. 18B illustrates an exemplar decoding workflow when the second method is applied. As shown in FIG. 18B, because the LIC uses the template (i.e., neighboring reconstructed samples) to calculate the LIC linear model, the LIC parameters can be immediately derived as soon as the neighboring reconstructed samples become available. This means that the PROF refinement and the LIC parameter derivation can be carried out at the same time.

The LIC weight and offset (i.e., $\alpha$ and $\beta$) and the PROF refinement (i.e., $\Delta I[x]$) are in general floating numbers. For friendly hardware implementations, those floating number operations are usually implemented as a multiplication with one integer value followed by a right-shift operation by a number of bits. In the existing LIC and PROF design, since the two tools are designed separately, two different right-shifts, by $N_{LIC}$ bits and $N_{PROF}$ bits respectively, are applied at the two stages.

According to a third embodiment, to improve the coding gain in case PROF and LIC are applied jointly to an affine coding block, it is proposed to apply the LIC-based and PROF-based sample adjustments at high precision. This is done by combining their two right-shift operations into one and apply it at the end to derive the final prediction samples (as shown in (12)) of the current block.

Addressing the Multiplication Overflow Problem when Combing the PROF with the Weighted Prediction and Bi-Prediction with CU-Level Weight (BCW)

According to the current PROF design in the VVC working draft, the PROF can be jointly applied with the weighted prediction (WP). For example, when they are combined, the prediction signal of one affine CU will be generated by the following procedures:

First, for each sample at position (x, y), calculate the L0 prediction refinement $\Delta I_0(x, y)$ based on the PROF and add the refinement to the original L0 prediction sample $I_0(x, y)$, i.e., $$\Delta I_0(x,y)=(gh_0(x,y)\cdot \Delta v_{x0}(x,y)+g_{v0}(x,y)\cdot \Delta v_{y0}(x,y)+1)\gg 1$$

$$I_0'(x,y)=I_0(x,y)+\Delta I_0(x,y) \qquad (23)$$

where $I_0'$ (x, y) is the refined sample; $g_{h0}$ (x, y) and $g_{v0}$ (x, y) and $\Delta v_{x0}$ (x, y) and $\Delta v_{y0}$ (x, y) are the L0 horizontal/vertical gradients and the L0 horizontal/vertical motion refinements at position (x, y).

Second, for each sample at position (x, y), calculate the L1 prediction refinement $\Delta I_1(x, y)$ based on the PROF and add the refinement to the original L1 prediction samples $I_1(x, y)$, i.e., $$\Delta I_1(x,y)=(g_{h1}(x,y)\cdot \Delta v_{x1}(x,y)+g_{v1}(x,y)\cdot \Delta v_{y1}(x,y)+1)\gg 1$$

$$I_1'(x,y)=I_1(x,y)+\Delta I_1(x,y) \qquad (24)$$

where $I_1'$ (x, y) is the refined sample; $g_{h1}$(x, y) and $g_{v1}$(x, y) and $\Delta v_{x1}$ (x, y) and $\Delta v_{y1}$(x, y) are the L1 horizontal/vertical gradients and the L1 horizontal/vertical motion refinements at position (x, y).

Third, combine the refined L0 and L1 prediction samples, i.e., $$I_{bi}(x,y)=(W_0\cdot I_0'(x,y)+W_1\cdot I_1'(x,y)+\text{Offset})\gg \text{shift} \qquad (25)$$

where $W_0$ and $W_1$ are the WP and BCW weight; shift and Offset are the offset and right shift that are applied to the weighted average of the L0 and L1 prediction signals for bi-prediction for the WP and the BCW. Here, the parameters for WP include $W_0$ and $W_1$ and Offset while the parameters for BCW include $W_0$ and $W_1$ and shift.

As can be seen from the above equations, due to sample-wise refinement, i.e., $\Delta I_0(x, y)$ and $\Delta I_1(x, y)$, the prediction samples after the PROF (i.e., $I_0'(x, y)$ and $I_1'(x, y)$) will have one increased dynamic range than the original prediction samples (i.e., $I_0(x, y)$ and $I_1(x, y)$). Given that the refined prediction samples will be multiplied with the WP and BCW weighting factors, this will increase the length of the multiplier that is needed. For example, based on the current design, when the internal coding bit-depth is ranging from 8 to 12-bit, the dynamic range of the prediction signal $I_0(x, y)$ and $I_1(x, y)$ is 16-bit. But, after the PROF, the dynamic range of the prediction signal $I_0'(x, y)$ and $I_1'(x, y)$ is 17-bit. Therefore, when the PROF is applied, it can potentially cause 16-bit multiplication overflow problem. In order to fix such overflow issues, multiple methods are proposed in the following:

First, in the first method, it is proposed to disable the WP and BCW when the PROF is applied to one affine CU.

Second, in the second method, it is proposed to apply one clipping operation to the derived sample refinements before adding to the original prediction samples such that the dynamic range of the refined prediction samples $I_0'(x, y)$ and $I_1'(x, y)$ will have the same dynamic bit-depth as that of the original prediction samples $I_0(x, y)$ and $I_1(x, y)$. For example, by such method, the sample refinement $\Delta I_0(x, y)$ and $\Delta I_1(x, y)$ will in (23) and (24) will be modified by introducing one clipping operation as depicted as:

$$\Delta I_0(x,y) = \text{clip3}(-2^{dI-1}, 2^{dI-1}-1, \Delta I_0(x,y))$$

$$\Delta I_1(x,y) = \text{clip3}(-2^{dI-1}, 2^{dI-1}-1, \Delta I_1(x,y))$$

where $dI = dI_{base} + \max(0, BD-12)$, where BD is the internal coding bit-depth; $dI_{base}$ is base bit-depth value. In one or more embodiments, it is proposed to set the value of $dI_{base}$ to be 14. In another embodiment, it is proposed to set the value to be 13. In another embodiment, it is proposed to directly set the value of dI to be fixed. In one example, it is proposed to set the value of dI to 13, i.e., the sample refinement will be clipped to the range [−4096, 4095]. In another example, it is proposed to set the value of dI to 14, i.e., the sample refinement will be clipped to the range [−8192, 8191].

First, in the third method, it is proposed to directly clip the refined prediction samples instead of clipping the sample refinements such that the refined samples have the same dynamic range as that of the original prediction samples. For example, by the third method, the refined L0 and L1 samples will be $$I_0'(x,y) = \text{clip3}(-2^{dR}, 2^{dR}-1, I_0(x,y) + \Delta I_0(x,y))$$

$$I_1'(x,y) = \text{clip3}(-2^{dR}, 2^{dR}-1, I_1(x,y) + \Delta I_1(x,y))$$

where $dR = 16 + \max(0, BD-12)$ (or equivalently $\max(16, BD+4)$), where BD is the internal coding bit-depth.

Second, in the fourth method, it is proposed to apply certain right-shifts to the refined L0 and L1 prediction samples before WP and BCW; the final prediction samples are then adjusted to original precisions by additional left-shifts. For example, the final prediction samples are derived as $$I_{bi}(x,y) = (W_0 \cdot (I_0'(x,y) \gg nb) + W_1 \cdot (I_1'(x,y) \gg nb) + \text{Offset}) \gg (\text{shift} - nb)$$

where nb is the number of additional bit-shifts that are applied which may be determined based on the corresponding dynamic range of the PROF samples refinements.

Third, in the fifth method, it is proposed to divide each multiplication of L0/L1 prediction sample with the corresponding WP/BCW weight in (25) into two multiplications and both two multiplications do not go beyond 16-bit, as described as $$I_{bi}(x,y) = (W_0 \cdot I_0(x,y) + W_0 \cdot \Delta I_0(x,y) + W_1 \cdot I_1(x,y) + W_1 \cdot \Delta I_1(x,y) + \text{Offset}) \gg \text{shift}$$

Figure 20:
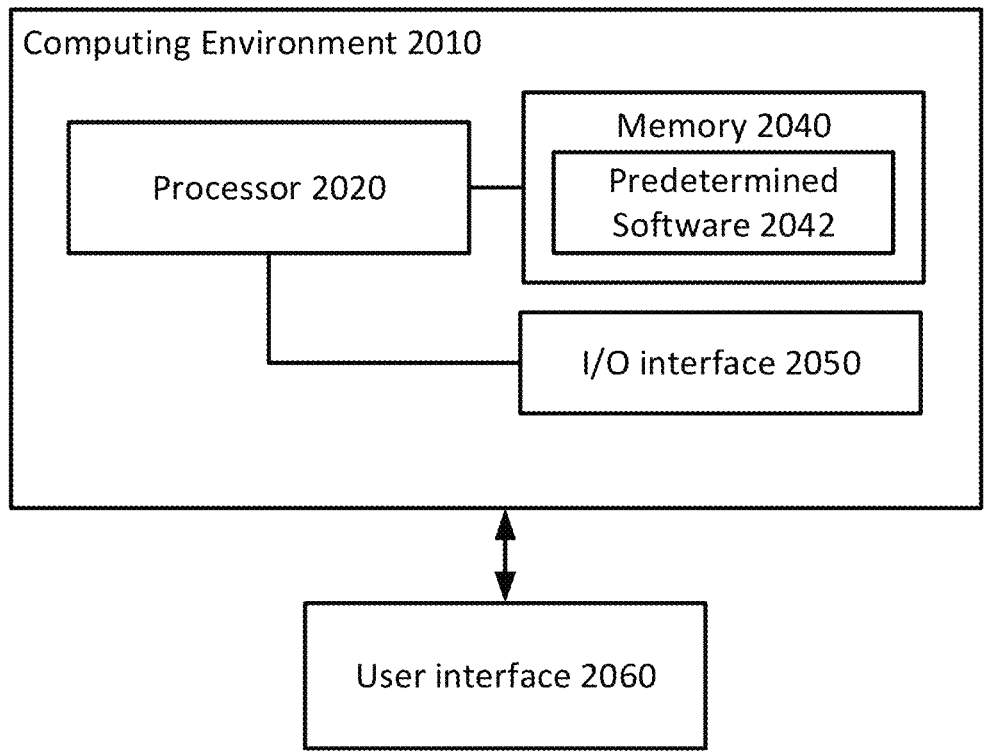
FIG. 20 is a diagram illustrating a computing environment coupled with a user interface, according to an example of the present disclosure.

FIG. 20 shows a computing environment 2010 coupled with a user interface 2060. The computing environment 2010 can be part of a data processing server. The computing environment 2010 includes processor 2020, memory 2040, and I/O interface 2050.

The processor 2020 typically controls overall operations of the computing environment 2010, such as the operations associated with the display, data acquisition, data communications, and image processing. The processor 2020 may include one or more processors to execute instructions to perform all or some of the steps in the above-described methods. Moreover, the processor 2020 may include one or more modules that facilitate the interaction between the processor 2020 and other components. The processor may be a Central Processing Unit (CPU), a microprocessor, a single chip machine, a GPU, or the like.

The memory 2040 is configured to store various types of data to support the operation of the computing environment 2010. Memory 2040 may include predetermine software 2042. Examples of such data comprise instructions for any applications or methods operated on the computing environment 2010, video datasets, image data, etc. The memory 2040 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The I/O interface 2050 provides an interface between the processor 2020 and peripheral interface modules, such as a keyboard, a click wheel, buttons, and the like. The buttons may include but are not limited to, a home button, a start scan button, and a stop scan button. The I/O interface 2050 can be coupled with an encoder and decoder.

In some embodiments, there is also provided a non-transitory computer-readable storage medium comprising a plurality of programs, such as comprised in the memory 2040, executable by the processor 2020 in the computing environment 2010, for performing the above-described methods. For example, the non-transitory computer-readable storage medium may be a ROM, a RAM, a CD-ROM, a magnetic tape, a floppy disc, an optical data storage device or the like.

The non-transitory computer-readable storage medium has stored therein a plurality of programs for execution by a computing device having one or more processors, where the plurality of programs when executed by the one or more processors, cause the computing device to perform the above-described method for motion prediction.

In some embodiments, the computing environment 2010 may be implemented with one or more application-specific integrated circuits (ASICs), digital signal processors (DSPs), digital signal processing devices (DSPDs), programmable logic devices (PLDs), field-programmable gate arrays (FPGAs), graphical processing units (GPUs), controllers, micro-controllers, microprocessors, or other electronic components, for performing the above methods.

The description of the present disclosure has been presented for purposes of illustration and is not intended to be exhaustive or limited to the present disclosure. Many modifications, variations, and alternative implementations will be apparent to those of ordinary skill in the art having the benefit of the teachings presented in the foregoing descriptions and the associated drawings.

The examples were chosen and described in order to explain the principles of the disclosure and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

What is claimed is:

1. A method of prediction refinement with optical flow (PROF) for decoding a video signal, comprising:
   obtaining, at a decoder, a reference picture I associated with a video block;
   obtaining, at the decoder, initial prediction samples of the video block from a reference block in the reference picture I;
   deriving, at the decoder, internal PROF parameters of a PROF derivation process by applying right-shifting operations, wherein the internal PROF parameters comprise horizontal gradient values, vertical gradient values, horizontal motion difference values, and vertical motion difference values derived for samples in the video block;
   obtaining, at the decoder, prediction refinement values for the samples in the video block based on the internal PROF parameters; and
   obtaining, at the decoder, refined prediction samples of the video block based on the initial prediction samples and the prediction refinement values.

2. The method of claim 1, wherein deriving the internal PROF parameters of the PROF derivation process by applying right-shifting operations comprises, for one sample within the video block:
   obtaining, at the decoder, a horizontal gradient value based on a difference between a first prediction sample and a second prediction sample associated with said one sample among the initial prediction samples;
   obtaining, at the decoder, a vertical gradient value based on a difference between a third prediction sample and a fourth prediction sample associated with said one sample among the initial prediction samples;
   obtaining, at the decoder, control point motion vectors (MVs) of one block that contains the video block;
   obtaining, at the decoder, affine model parameters based on the control point MVs;
   obtaining, at the decoder, a horizontal motion difference value and a vertical motion difference value based on the affine model parameters; and
   obtaining, at the decoder, the horizontal motion difference value and the vertical motion difference value by right shifting by a bit-shift value, wherein the bit-shift value is equal to 8.

3. The method of claim 2, further comprising:
   clipping, at the decoder, the horizontal motion difference value to a symmetric range of [−31, 31]; and
   clipping, at the decoder, the vertical motion difference value to the symmetric range of [−31, 31].

4. The method of claim 2, wherein obtaining the prediction refinement values for the samples in the video block comprises:
   obtaining, at the decoder, the prediction refinement values based on the horizontal gradient values, the horizontal motion difference values, the vertical gradient values, and vertical motion difference values.

5. A computing device, comprising:
   one or more processors;
   a non-transitory computer-readable storage medium storing instructions executable by the one or more processors, wherein the one or more processors are configured to:
   obtain a reference picture I associated with a video block;
   obtain initial prediction samples of the video block from a reference block in the reference picture I;
   derive internal prediction refinement with optical flow (PROF) parameters of a PROF derivation process by applying right-shifting operations, wherein the internal PROF parameters comprise horizontal gradient values, vertical gradient values, horizontal motion difference values, and vertical motion difference values derived for samples in the video block;
   obtain prediction refinement values for the samples in the video block based on the internal PROF parameters; and
   obtain refined prediction samples of the video block based on the initial prediction samples and the prediction refinement values.

6. The computing device of claim 5, wherein the one or more processors configured to derive the internal PROF parameters of the PROF derivation process by applying right-shifting operations are further configured to, for one sample within the video block:
   obtain a horizontal gradient value based on a difference between a first prediction sample and a second prediction sample associated with said one sample among the initial prediction samples;
   obtain a vertical gradient value based on a difference between a third prediction sample and a fourth prediction sample associated with said one sample among the initial prediction samples;
   obtain control point motion vectors (MVs) of one block that contains the video block;
   obtain affine model parameters based on the control point MVs;
   obtain a horizontal motion difference value and a vertical motion difference value based on the affine model parameters; and
   obtain the horizontal motion difference value and the vertical motion difference value by right shifting by a bit-shift value, wherein the bit-shift value is equal to 8.

7. The computing device of claim 6, wherein the one or more processors are further configured to:
   clip the horizontal motion difference value to a symmetric range of [−31, 31]; and
   clip the vertical motion difference value to the symmetric range of [−31, 31].

8. The computing device of claim 6, wherein the one or more processors configured to obtain the prediction refinement values for the samples in the video block are further configured to:
   obtain the prediction refinement values based on the horizontal gradient values, horizontal motion difference values, the vertical gradient values, and vertical motion difference values.

9. A non-transitory computer readable storage medium storing a bitstream to be decoded by a method for decoding a video signal comprising:
    obtaining a reference picture I associated with a video block;
    obtaining initial prediction samples of the video block from a reference block in the reference picture I;
    deriving internal prediction refinement with optical flow (PROF) parameters of a PROF derivation process by applying right-shifting operations, wherein the internal PROF parameters comprise horizontal gradient values, vertical gradient values, horizontal motion difference values, and vertical motion difference values derived for samples in the video block;
    obtaining prediction refinement values for the samples in the video block based on the internal PROF parameters; and
    obtaining refined prediction samples of the video block based on the initial prediction samples and the prediction refinement values.

10. The non-transitory computer readable storage medium of claim 9, wherein the method further comprises, for one sample within the video block:
    obtaining a horizontal gradient value based on a difference between a first prediction sample and a second prediction sample associated with said one sample among the initial prediction samples;
    obtaining a vertical gradient value based on a difference between a third prediction sample and a fourth prediction sample associated with said one sample among the initial prediction samples;
    obtaining control point motion vectors (MVs) of one block that contains the video block;
    obtaining affine model parameters based on the control point MVs;
    obtaining a horizontal motion difference value and a vertical motion difference value based on the affine model parameters; and
    obtaining the horizontal motion difference value and the vertical motion difference value by right shifting by a bit-shift value, wherein the bit-shift value is equal to 8.

11. The non-transitory computer readable storage medium of claim 10, wherein the method further comprises:
    clipping the horizontal motion difference value to a symmetric range of [−31, 31]; and
    clipping the vertical motion difference value to the symmetric range of [−31, 31].

12. The non-transitory computer readable storage medium of claim 10, wherein the method further comprises:
    obtaining the prediction refinement values based on the horizontal gradient values, horizontal motion difference values, the vertical gradient values, and vertical motion difference values.

* * * * *